(12) United States Patent
Reichelderfer et al.

(10) Patent No.: US 12,262,847 B2
(45) Date of Patent: Apr. 1, 2025

(54) AUTOMATED COOKING SYSTEM AND METHOD USING BASKET-GANTRY INTERFACE

(71) Applicant: Henny Penny Corporation, Eaton, OH (US)

(72) Inventors: Kimberly Reichelderfer, Yellow Springs, OH (US); Thomas M. Smith, Lewisburg, OH (US); Adrian Jason Pereira, Dayton, OH (US); Michael Maddux, Kettering, OH (US)

(73) Assignee: Henny Penny Corporation, Eaton, OH (US)

( * ) Notice: Subject to any disclaimer, the term of this patent is extended or adjusted under 35 U.S.C. 154(b) by 933 days.

(21) Appl. No.: 17/344,063

(22) Filed: Jun. 10, 2021

(65) Prior Publication Data
US 2022/0346600 A1    Nov. 3, 2022

Related U.S. Application Data

(63) Continuation-in-part of application No. 17/244,096, filed on Apr. 29, 2021, now Pat. No. 11,678,769.

(51) Int. Cl.
*A47J 37/12* (2006.01)
*A23L 5/10* (2016.01)
(Continued)

(52) U.S. Cl.
CPC ............. *A47J 37/1228* (2013.01); *A23L 5/11* (2016.08); *A47J 37/1219* (2013.01);
(Continued)

(58) Field of Classification Search
CPC ................ A47J 37/1228; A47J 37/1219; A47J 37/1266; A47J 37/1295; A47J 37/1276; A47J 37/1271; A47J 537/12
(Continued)

(56) References Cited

U.S. PATENT DOCUMENTS 3,164,406 A    1/1965   Barry
4,722,267 A    2/1988   Galockin et al.
(Continued)

FOREIGN PATENT DOCUMENTS

JP       863288117 A     11/1988
KR       10-0984964      10/2010
(Continued)

OTHER PUBLICATIONS

European Patent Office, Extended Search Report issued in EP Application No. 22168774.2-1004 mailed Sep. 22, 2022 (10 pages).
(Continued)

*Primary Examiner* — Phuong T Nguyen
(74) *Attorney, Agent, or Firm* — Wood Herron & Evans LLP

(57) ABSTRACT

An automated cooking system for adding time and labor efficiencies in food production environments such as restaurants. The automated cooking system includes at least a fryer, a dispensing freezer, a hot holding station, a plurality of baskets, and a gantry system. The gantry system includes a gantry control for a gantry, configured to engage and move each of the baskets. The basket and gantry include interface elements for enabling precise movements and rapid opening and closing of baskets at the system. Aspects of an automated cooking system and a corresponding method for discharging cooked food product help to avoid the problems associated with manually operating a cooking system. Specifically, the system described herein provides for apparatuses and methods to cook and dispense food product in a more efficient manner with regard to both time and labor considerations within food production environments.

13 Claims, 20 Drawing Sheets

(51) Int. Cl.
*B25J 9/10* (2006.01)
*B25J 13/08* (2006.01)
*B25J 15/00* (2006.01)
*B25J 9/02* (2006.01)

(52) U.S. Cl.
CPC ....... *A47J 37/1266* (2013.01); *A47J 37/1295* (2013.01); *B25J 9/1005* (2013.01); *B25J 13/08* (2013.01); *B25J 15/0028* (2013.01); *B25J 15/0038* (2013.01); *A23V 2002/00* (2013.01); *B25J 9/026* (2013.01)

(58) Field of Classification Search
USPC ................ 99/331, 403, 404, 409, 427, 419; 426/302, 438, 523; 219/430, 432
See application file for complete search history.

(56) References Cited

U.S. PATENT DOCUMENTS

| | | | |
|---|---|---|---|
| 4,901,633 A | 2/1990 | De Longhi | |
| 4,913,038 A | 4/1990 | Burkett et al. | |
| 4,951,558 A | 8/1990 | Figliuzzi | |
| 5,112,633 A | 5/1992 | Benson et al. | |
| 5,142,968 A | 9/1992 | Caron et al. | |
| 5,172,328 A * | 12/1992 | Cahlander ............... | A47J 27/14 700/211 |
| 5,191,918 A | 3/1993 | Cahlander et al. | |
| 5,224,415 A | 7/1993 | McFadden et al. | |
| 5,230,279 A | 7/1993 | McFadden et al. | |
| 5,232,151 A | 8/1993 | Mercer et al. | |
| 5,263,406 A | 11/1993 | Chiu | |
| 5,973,297 A | 10/1999 | Winter et al. | |
| 6,165,525 A | 12/2000 | Rolle et al. | |
| 6,427,583 B1 | 8/2002 | Shimansky et al. | |
| 6,588,325 B1 | 7/2003 | Savage | |
| 6,869,633 B2 | 3/2005 | Sus et al. | |
| 7,100,497 B2 | 9/2006 | Shandross | |
| 7,343,719 B2 | 3/2008 | Sus et al. | |
| 7,441,388 B2 | 10/2008 | Sus et al. | |
| 7,775,156 B2 | 8/2010 | Sus et al. | |
| 8,034,390 B2 | 10/2011 | Sus et al. | |
| 8,037,812 B1 | 10/2011 | Sumner, Sr. | |
| 8,065,954 B2 | 11/2011 | Foster et al. | |
| 8,549,993 B2 | 10/2013 | Foster et al. | |
| 8,551,331 B2 | 10/2013 | Burkett et al. | |
| 8,584,579 B1 | 11/2013 | Sumner, Sr. | |
| 8,618,447 B2 | 12/2013 | De' Longhi | |
| 8,850,965 B2 | 10/2014 | Popeil et al. | |
| 10,205,605 B2 | 2/2019 | Han | |
| 10,641,274 B2 | 5/2020 | Chien et al. | |
| 2003/0192435 A1 | 10/2003 | McNair | |
| 2003/0205147 A1 | 11/2003 | Schackmuth et al. | |
| 2004/0060456 A1 | 4/2004 | Chung | |
| 2007/0214968 A1 | 9/2007 | Larson et al. | |
| 2007/0251517 A1 | 11/2007 | Sus et al. | |
| 2008/0121578 A1 | 5/2008 | Burkett et al. | |
| 2008/0237104 A1 | 10/2008 | Foster et al. | |
| 2009/0084273 A1 | 4/2009 | Lackman et al. | |
| 2010/0037782 A1 | 2/2010 | Foster et al. | |
| 2011/0203570 A1 | 8/2011 | Popeil et al. | |
| 2012/0167778 A1 | 7/2012 | Popeil et al. | |
| 2014/0227411 A1 | 8/2014 | Popeil et al. | |
| 2014/0302211 A1 | 10/2014 | Rose et al. | |
| 2017/0095118 A1 | 4/2017 | Loss et al. | |
| 2018/0033005 A1 | 2/2018 | Sines et al. | |
| 2019/0032958 A1 | 1/2019 | Ohse et al. | |
| 2020/0046168 A1 | 2/2020 | Sinnet et al. | |
| 2020/0305464 A1 | 10/2020 | Hohler et al. | |
| 2020/0305646 A1 | 10/2020 | Hohler et al. | |
| 2021/0235929 A1 | 8/2021 | Perkins et al. | |

FOREIGN PATENT DOCUMENTS

| | | |
|---|---|---|
| KR | 10-1288282 | 7/2013 |
| KR | 10-2017-0064979 | 6/2017 |
| WO | 2019108909 A1 | 6/2019 |
| WO | 2019136406 A1 | 7/2019 |

OTHER PUBLICATIONS

European Patent Office, Extended Search Report issued in EP Application No. 22170595.7-1004 mailed Sep. 28, 2022 (9 pages).
European Patent Office, Extended Search Report issued in EP Application No. 221687775.5-1004 mailed Sep. 30, 2022 (10 pages).
International Searching Authority, Search Report and Written Opinion issued in International Patent Application No. PCT/US2018/063272 mailed Feb. 5, 2019 (16 pages).
International Searching Authority, Preliminary Report on Patentability issued in International Patent Application No. PCT/US2018/063272 mailed Dec. 2, 2019 (20 pages).

\* cited by examiner

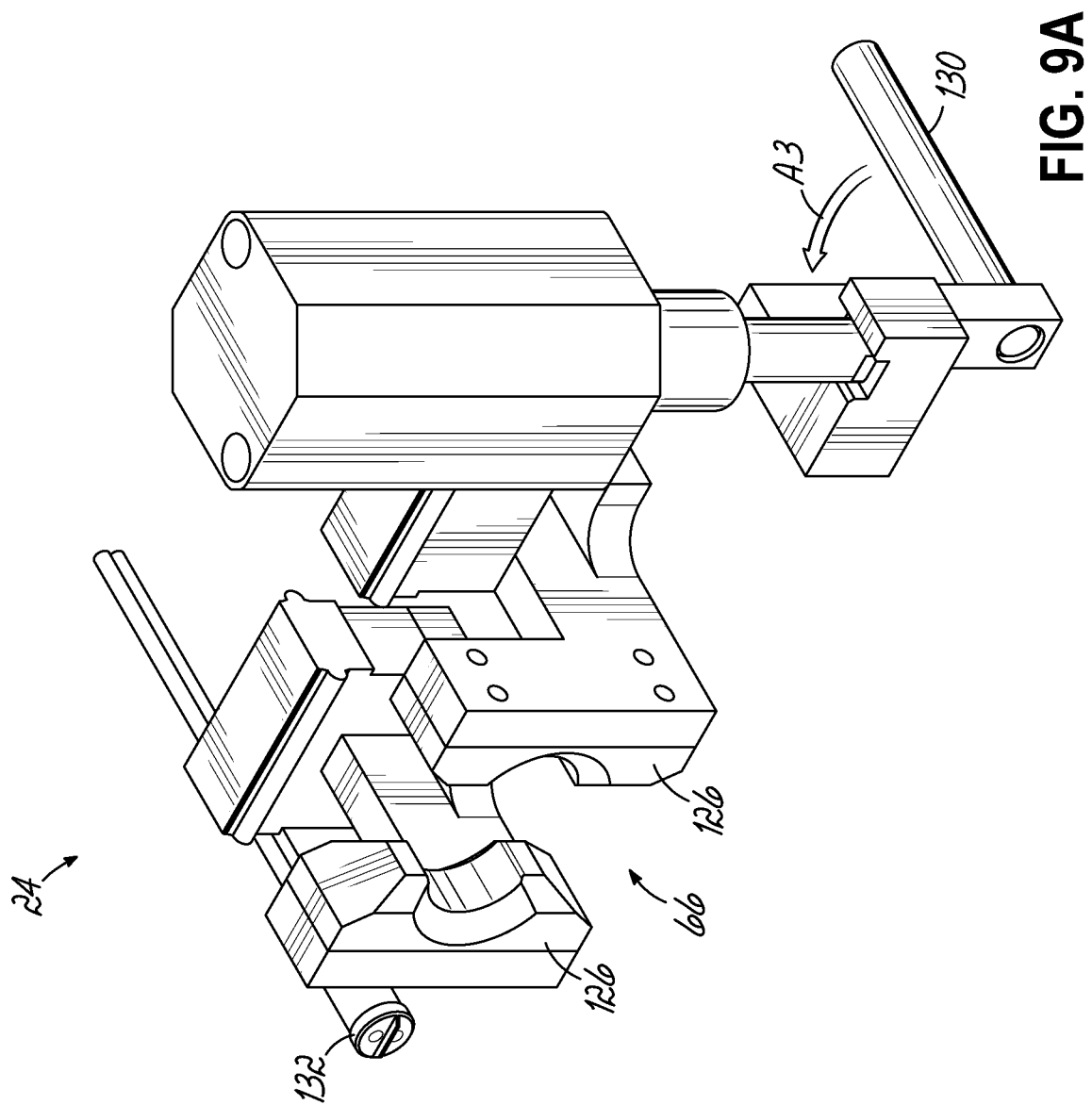

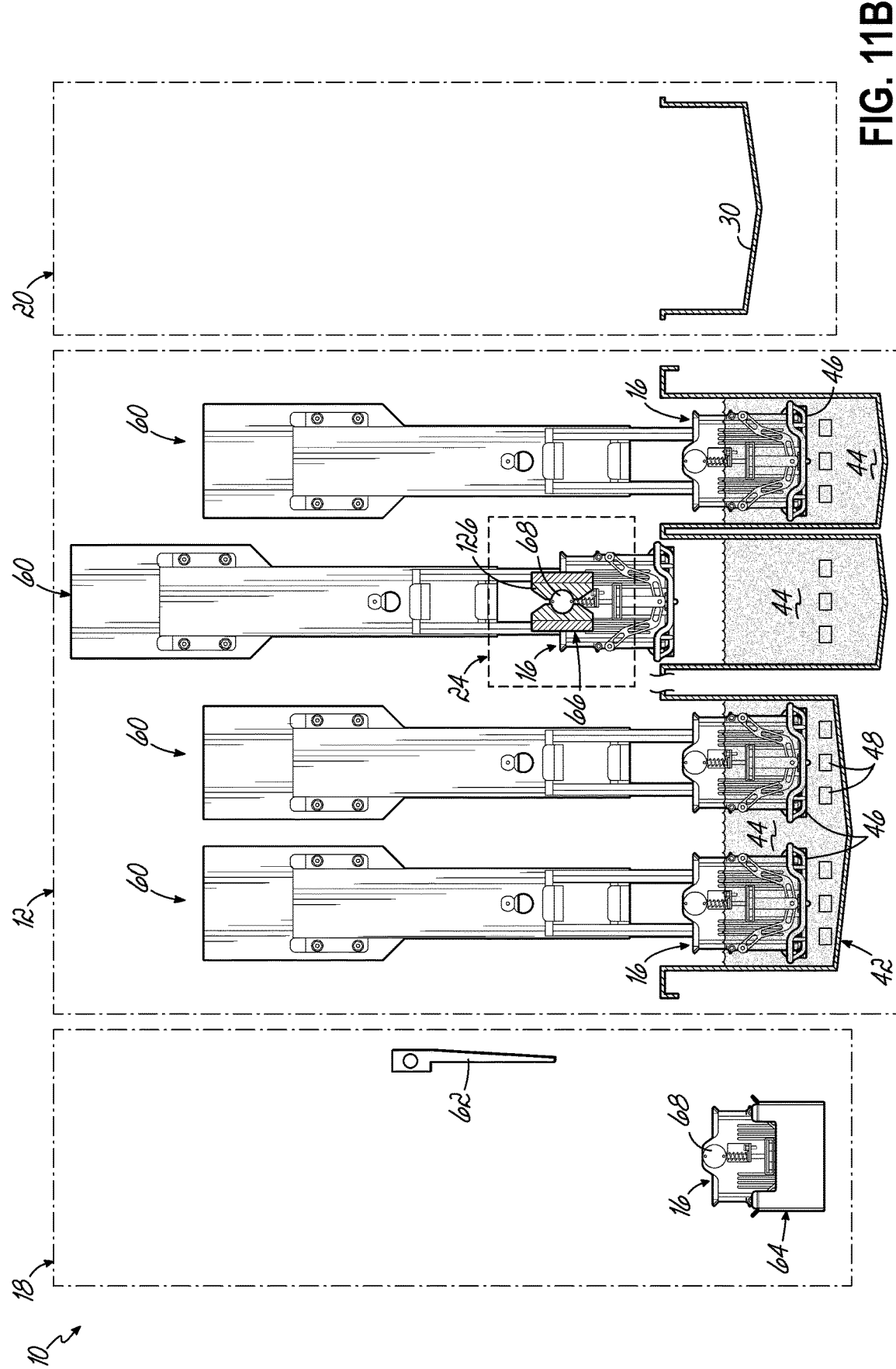

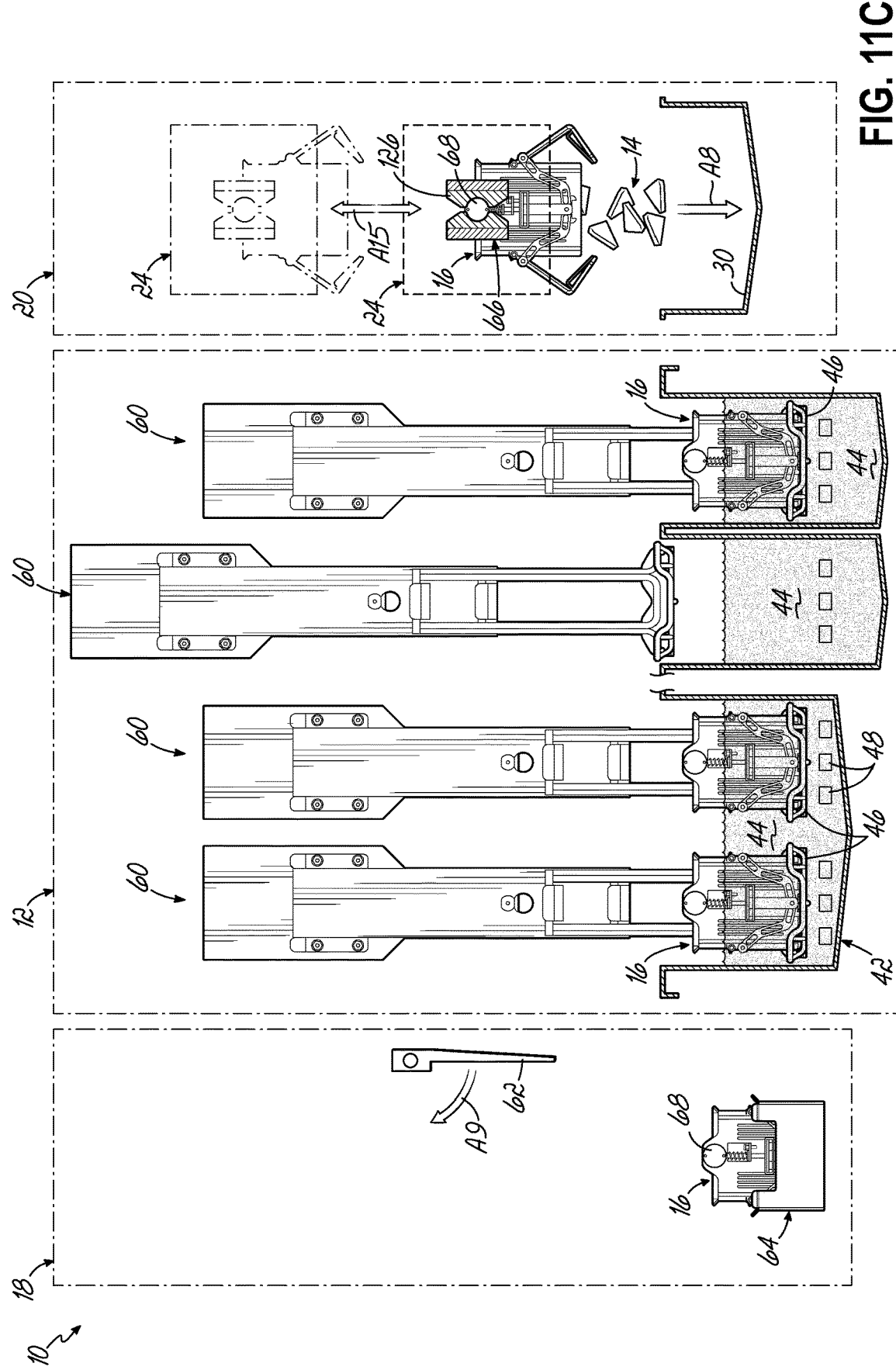

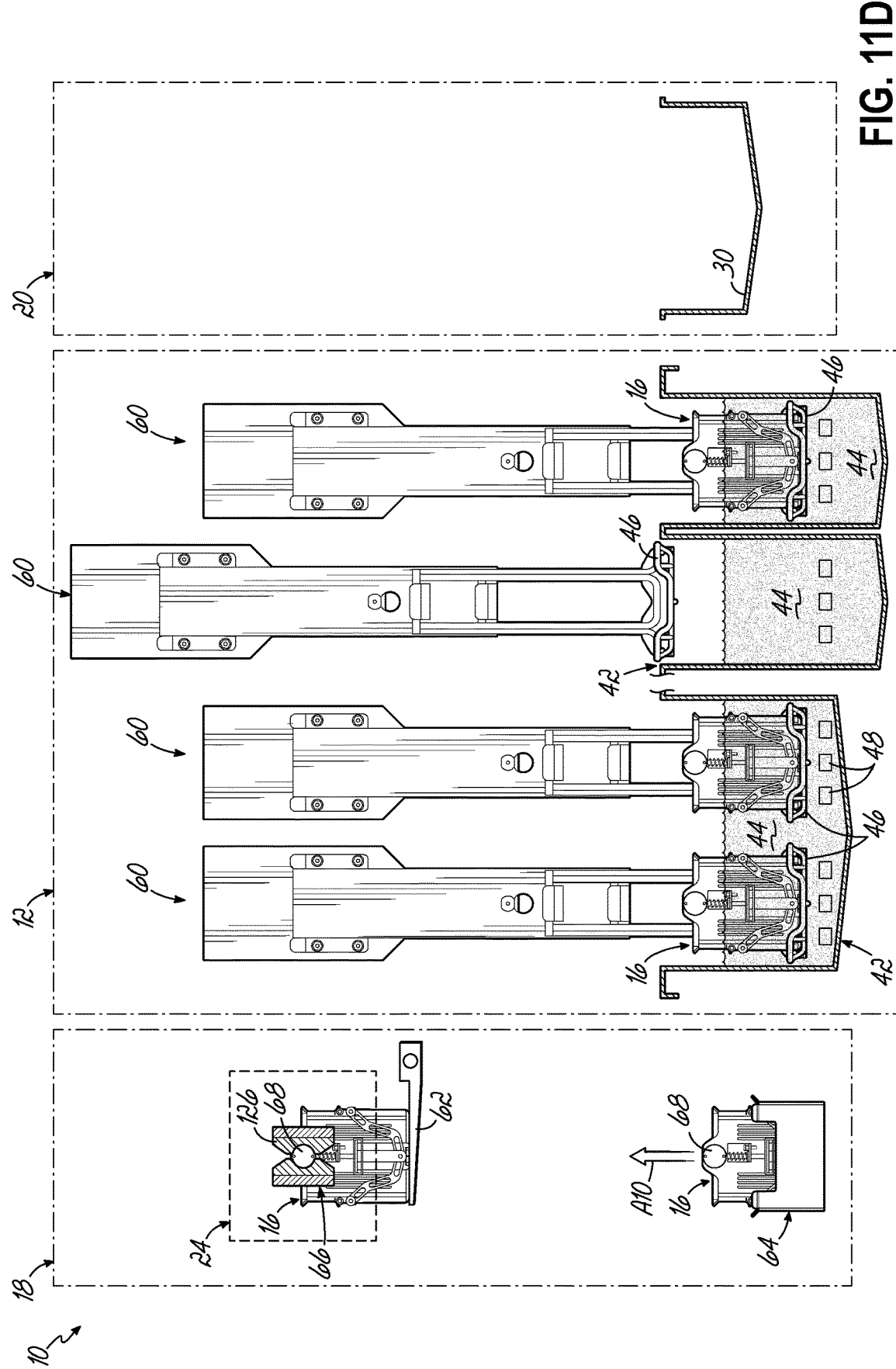

AUTOMATED COOKING SYSTEM AND METHOD USING BASKET-GANTRY INTERFACE

CROSS-REFERENCE TO RELATED APPLICATION

This application is related to and claims priority to U.S. patent application Ser. No. 17/244,096 filed on Apr. 29, 2021, the entire content of which is herein incorporated by reference.

TECHNICAL FIELD

This application relates generally to food product cooking systems and methods. More specifically, this application describes mechanisms and methods for adding time and labor efficiencies in food production environments such as restaurants.

BACKGROUND

Cooking apparatuses, such as fryers, are used to cook various food products, e.g., poultry, fish, potato products, and the like. Such cooking apparatuses may include one or more cooking chambers, e.g., fryer pots or vats, which may be filled with a cooking medium, e.g., an oil, a liquid shortening, or a meltable-solid shortening. Such cooking apparatuses also may include a heating element, e.g., an electrical heating element, such as a heating coil, or a gas heating element, such as a gas burner and gas conveying tubes, which heats the cooking medium in the cooking chamber. After the cooking medium reaches a preset cooking temperature, food products are placed into the cooking medium such that the food products are cooked in the cooking medium. For example, the food products may be positioned inside a basket, e.g., a wire basket, and submerged in the cooking medium for a predetermined amount of time sufficient to cook the food products. Conventional fryers typically require basket movement and workflow to be handled manually by an operator. In such fryers, the maximum production of the fryer is often limited by the responsiveness of the operator and their ability to manage multiple baskets and cooking tasks at the same time.

However, restaurants continue to strive to increase production in order to satisfy customer demand. One way to increase production is to utilize a high-volume fryer, such as by replacing a restaurant's pre-existing traditional open fryer with a high-volume fryer. However, high-volume fryers are typically relatively large, and restaurants must operate within the space constraints imposed by the buildings which they occupy. As a result, restaurant equipment, including fryers, must be sized to fit within certain parameters. For example, kitchen layouts may allow a particular amount of space for a fryer and may be unable to accommodate fryers having footprints greater than that space. Some restaurants may allow a footprint of about 90-100 inches by about 30 inches for a fryer, as well as an associated preparation or holding area. A high-volume fryer of a conventional design may require significantly more space than this. Many restaurants would be required to undergo substantial building renovations, replace previously installed hoods, or sacrifice space intended for other uses in order to reap the benefits of high-volume fryers. Those reconfigurations are expensive, highly disfavored, and sometimes impossible.

Thus, it would be desirable to provide systems and methods to cook food product in a more efficient manner, specifically with regard to time and labor considerations within a restaurant, while also achieving higher maximum production levels than traditional fryer systems and methods relying on manual manipulation and handling of baskets.

SUMMARY

In accordance with embodiments of the invention, aspects of an automated cooking system and a corresponding method for discharging cooked food product are described. Aspects of an automated cooking system and a corresponding method for discharging cooked food product help to avoid the problems associated with manually operating a cooking system. Specifically, the aspects of an automated cooking system described herein provide for systems and methods to cook and dispense food product in a more efficient manner with regard to both time and labor considerations within the constraints of a restaurant.

In one implementation of the invention, an automated cooking system including a fryer basket and a gantry is provided. The gantry includes a clamping gripper that clamps a pair of jaws into engagement with a pickup point of the basket to move the basket within the automated cooking system. The gantry also includes an actuator arm configured to interact with the basket. The basket is suspended in place by the clamping gripper and the actuator arm interacts with the basket in such a way as to cause the basket to discharge its contents. Further, the product discharge mechanism is configured to be actuated by an actuator arm attached to a gantry.

In one embodiment, the actuator arm of the gantry actuates the product discharge mechanism by moving the collar of the product discharge mechanism in the axial direction.

In yet another implementation of the invention, an automated cooking system is provided. The automated cooking system includes a fryer basket. The fryer basket includes a frame defining a storage space within the basket. The basket also includes a pickup point operatively connected to the frame. The pickup point includes a main body. The main body is operatively connected to the frame and extends outward therefrom. The pickup point also includes a neck portion attached to and extending outwardly from the main body. The neck portion is narrower in diameter than the main body and the neck portion is the part of the pickup point that is intended to be gripped. The pickup point further includes a head portion attached to and extending outwardly from the neck portion. The head portion is greater in diameter than the neck portion and helps the neck portion to be gripped. Returning to the basket, the basket also includes two angled panels that are coupled to and extend from the frame. Each of the angled panels pivot between a closed position and an open position. Returning to the automated cooking system, the system also includes a gantry. The gantry includes a clamping gripper that clamps a pair of jaws into engagement with the pickup point of a basket. The gantry engages with the basket at only the pickup point and the engagement between the pair of jaws and the pickup point is configured to prevent uncontrolled rotational movements of the basket when the basket is moved.

In one embodiment, the head portion is substantially coextensive in diameter with the main body. Further, the main body and the head portion are tapered inwards towards the neck portion to help correct potential misalignment of the jaws of the clamping gripper on the pickup point. Moreover, the neck portion is substantially coextensive in width to the jaws of clamping gripper.

In another embodiment, the pickup point includes a flat surface along a chord of a cross-section of the neck portion. The pickup point also includes a dowel located above the flat surface of the neck portion. The dowel spans a distance from the head portion to the main body. Additionally, at least the dowel is configured to engage with the jaws of the clamping gripper to prevent uncontrolled rotational movements of the basket when the basket is moved as to avoid impacts of the basket with any other basket of the automated cooking system.

In yet another embodiment, the clamping gripper is pneumatically powered. Additionally, each of the jaws of the clamping gripper is C-shaped as to snugly fit the pickup point between the pair of jaws when engaging with the basket. Moreover, an edge of the jaw that contacts the pickup point of the basket is contoured to facilitate easier gripping of the pickup point.

In a further embodiment, the basket further includes a product discharge mechanism positioned adjacent the frame and operatively coupled to the angled panels. Additionally, the gantry further includes an actuator arm configured to interact with the basket, suspended in place by the clamping gripper, in such a way as to cause the basket to discharge its contents. Moreover, the actuator arm is pneumatically powered. Further, when not in active use the actuator arm is rotated away from the front of the gantry as to not cause inadvertent contact with the basket.

In one embodiment, the automated cooking system further includes a basket detection device. The basket detection device is configured to detect the presence of a basket in front of the clamping gripper. The basket detection device is used to line up the jaws of the clamping gripper with the pickup point of the basket. Further, the basket detection device can be selected from the group consisting of a proximity switch, a torque sensor, and a laser.

In another implementation of the invention, a method of discharging food product from a fryer basket of an automated cooking system is provided. The basket includes a frame defining a storage space within the basket. The basket also includes a pickup point operatively connected to the frame and two angled panels that are coupled to and extend from the frame. Each of the angled panels pivot between a closed position and an open position. The basket also includes a product discharge mechanism positioned adjacent the frame and operatively coupled to the angled panels. Returning to the automated cooking system, the system includes a gantry attached to a gantry system. The gantry includes a clamping gripper. The clamping gripper includes a pair of jaws. The gantry further includes an actuator arm configured to interact with the basket. Returning to the method of discharging food product, the method includes aligning the jaws of the clamping gripper with the pickup point of the basket such that the pickup point is located between the jaws of the clamping gripper. The method also includes engaging the pickup point of the basket with the jaws of the clamping gripper such that the pickup point is secured between the jaws of the clamping gripper. The pickup point and the jaws of the clamping gripper are collectively configured to prevent uncontrolled rotational movements of the basket when the basket is moved as to avoid impacts of the basket with any other basket of the automated cooking system. The method further includes transporting, via the gantry system, the basket to a location within the automated cooking system where the basket is to discharge its contained food product. Additionally, the method includes actuating the product discharge mechanism of the basket with the actuator arm of the gantry, thereby causing the angled panels of the basket to pivot to an open position, creating an opening in the bottom of the basket. The method also includes discharging food product contained within the basket through the opening in the bottom of the basket.

In one embodiment, the step of aligning the jaws with the pickup point includes using a basket detection device. The basket detection device is configured to detect the presence of a basket in front of the clamping gripper.

In a further implementation of the invention, an automated cooking system is provided. The automated cooking system includes a fryer basket. The fryer basket includes a pickup point that is operatively connected to the basket. The pickup point is configured to be gripped to enable the basket to be moved. The basket further includes a product discharge mechanism coupled to the basket. The product discharge mechanism is biased to maintain the basket in a closed state until the product discharge mechanism is actuated. When the product discharge mechanism is actuated, the basket is moved to an open state. The automated cooking system further includes a gantry. The gantry features a clamping gripper. The clamping gripper is configured to clamp a pair of jaws into engagement with the pickup point of the basket to move the basket within the automated cooking system. The gantry further includes an actuator arm that is configured to interact with the product discharge mechanism to cause the basket to discharge its contents while the basket is suspended in place by the clamping gripper. The actuator arm rotates and moves upwardly with a force to actuate the product discharge mechanism.

In one embodiment, the product discharge mechanism bias is a spring bias. Further, the force applied by the actuator arm to the product discharge mechanism is sufficient to overcome the spring bias. Additionally, when not in active use the actuator arm is rotated away from the front of the gantry as to not cause inadvertent contact with the basket. Furthermore, the actuator arm may be an elongated rod that is generally cylindrically shaped.

In another embodiment, the automated cooking system further includes a basket detection device. The basket detection device is configured to detect a presence of a basket in front of the clamping gripper and is used to line up the jaws of the clamping gripper with the pickup point of the basket. Further, the basket detection device is selected from a group consisting of a proximity switch, a torque sensor, and a laser.

The steps and elements described herein as part of various embodiments and aspects can be reconfigured and combined in different combinations to achieve the desired technical effects as may be desired. To this end, the embodiments and aspects can be combined in any combination or sub-combination.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 9A is a front perspective view of a portion of a gantry in accordance with an embodiment of the invention, showing the actuator arm rotated away from the front of the gantry.

FIG. 11B is a front view similar to FIG. 11A, showing a further stage of the exemplary cooking cycle using the automated cooking system.

FIG. 11C is a front view similar to FIG. 11A, showing another stage of the exemplary cooking cycle using the automated cooking system.

FIG. 11D is a front view similar to FIG. 11A, showing yet another stage of the exemplary cooking cycle using the automated cooking system.

DETAILED DESCRIPTION

Figure 1:
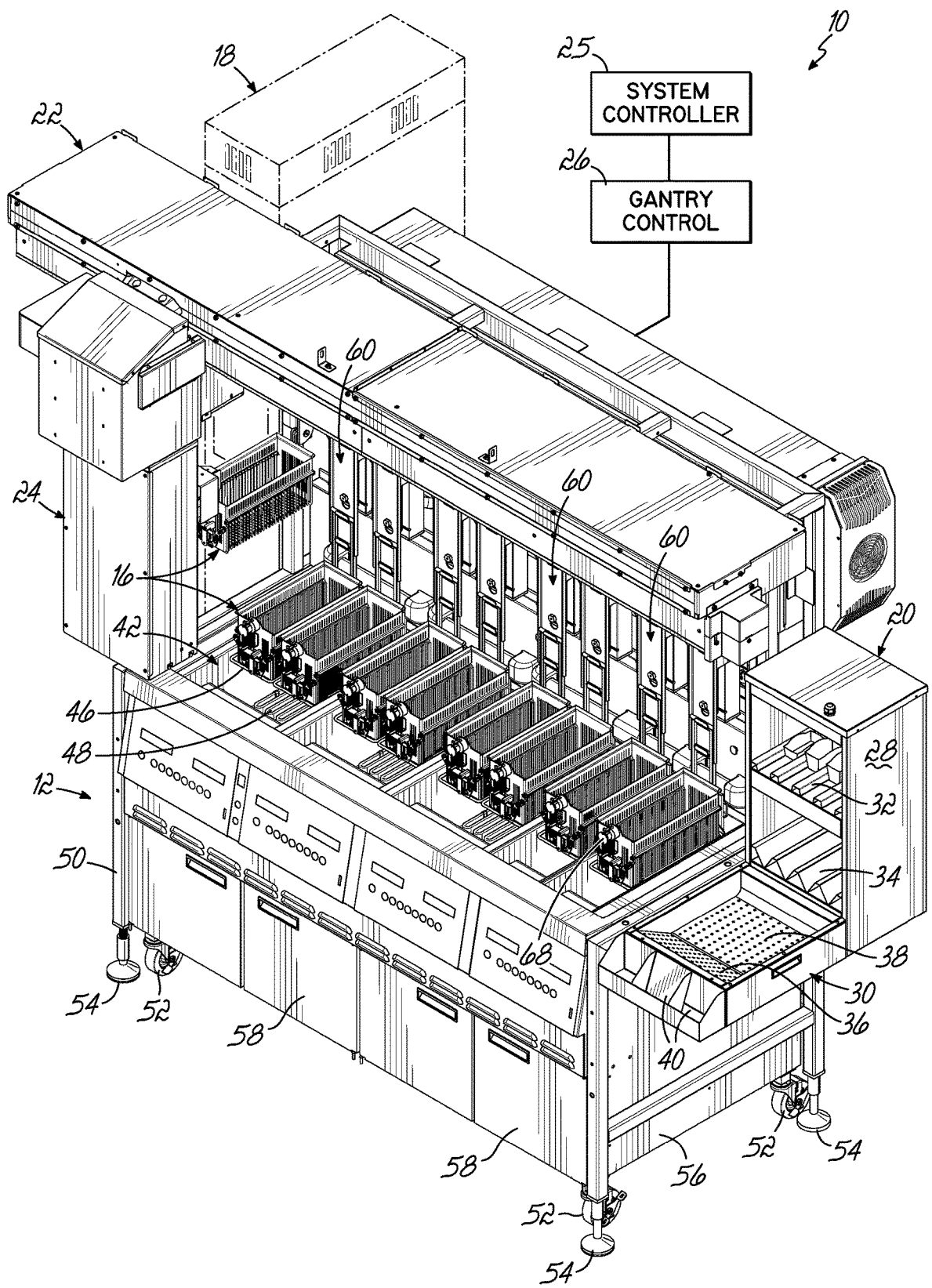
FIG. 1 is a front perspective view of an automated cooking system in accordance with an embodiment of the invention.
Figure 2:
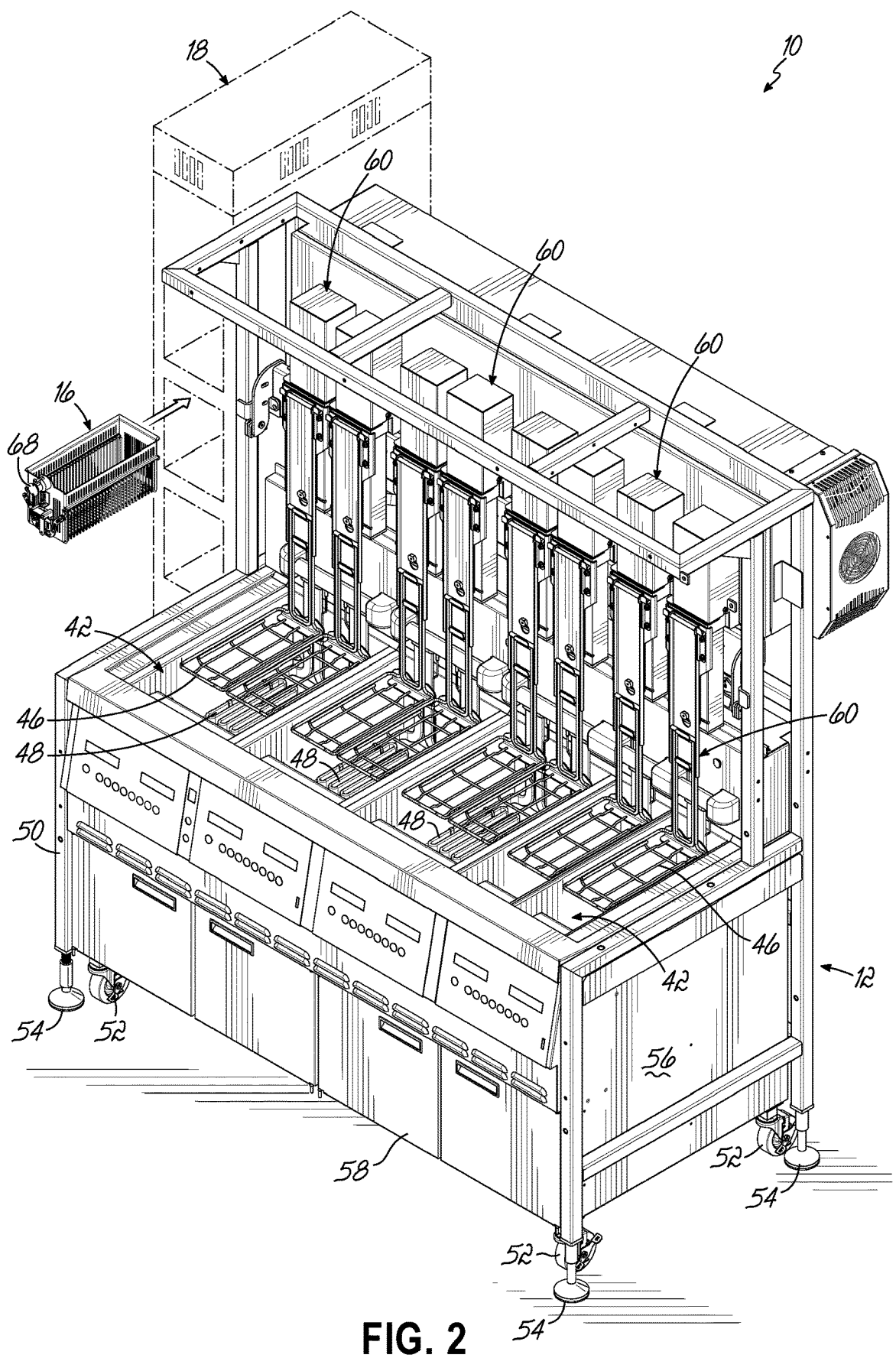
FIG. 2 is a front perspective view of a fryer included in the automated cooking system of FIG. 1, but with the gantry removed for purposes of illustration.

With reference to FIGS. 1 and 2, an automated cooking system 10 including a fryer 12 is shown in accordance with an exemplary embodiment. As set forth in further detail below, the system 10 and fryer 12 provide improved efficiency in cooking operations. The cooking system 10 achieves the increased production by efficiently managing the workflow of baskets 16 moving between a dispensing freezer 18, the fryer 12, and a hot holding station 20. More specifically, the workflow of baskets 16 is primarily achieved using a gantry system 22. The gantry system 22 includes a gantry 24 and a gantry control 26, which may be a part of or separate from a system controller 25 for the automated cooking system 10. The gantry 24 of this system 10 engages with and actuates the baskets 16 using innovative interface elements described below that collectively improve both the movement precision and reliability for baskets 16 while also allowing for better system cycle efficiencies resulting at least in part from rapid basket opening and closing operations performed using such interface elements. The system 10 described herein provides for cooking food product 14 in a more efficient manner with regard to both time and labor considerations within the constraints of a restaurant. The features of the automated cooking system 10 and the fryer 12 are set forth in further detail below to clarify each of these functional advantages and other benefits provided in this disclosure. Other advantages and technical effects of the embodiments of this invention will become evident to one skilled in the art from the following description.

Continuing with reference to FIG. 1, an exemplary automated cooking system 10 is shown. The automated cooking system 10 includes the fryer 12, a plurality of baskets 16, a dispensing freezer 18, a hot holding station 20, and a gantry system 22. The dispensing freezer 18 is of a mostly conventional design, and thus, is not shown in significant detail in the Figures. However, the dispensing freezer 18 shown in this embodiment includes a dispenser (not shown) for dispensing food product 14. Food product 14, for example, waffle fries, are dispensed into a basket 16 from the dispenser of the dispensing freezer 18, cooked in the fryer 12, and then transferred from the fryer 12 to the hot holding station 20 via the baskets 16, as discussed in greater detail below.

The hot holding station 20 of the embodiment shown in FIG. 1 receives cooked food product 14 from the basket 16 of the fryer 12, to thereby enable operator manipulation and packaging to finalize preparation of the food products 14 for delivery to fulfill customer demands, as well understood in the restaurant field. The hot holding station 20 is of conventional design and is briefly described as follows: it includes a hot holding cabinet 28 and a hot holding receiving area 30. As shown, the hot holding cabinet 28 may include a plurality of vertical slots 32 or angled corrugated slots 34 to hold the now cooked food product 14. For example, the hot holding receiving area 30 may include an angled front portion 36, and a plurality of air flow apertures 38 to enable circulating air flow to help the cooked food product 14 remain in a desirable state. Receptacles 40 for holding packaging to load food products 14 into may be located in the front of the hot holding receiving area 30. Since the throughput of this automated cooking system 10 exceeds current systems, the hot holding receiving area 30 is generally larger to enable one or more workers to package the cooked food product 14 and keep up with the throughput of the automated cooking system 10. It will be understood that other types of hot holding 20 and preparation stations may be used with the fryer 12 in other embodiments. For example, an automated holding and packaging station may be later developed and combined with the features of the automated cooking system 10 described in detail below, without departing from the scope of this disclosure.

Still referring to FIG. 1, interfacing with a touch-screen control (not shown) or the like according to an embodiment, the operator selects the quantity of food product 14 and the repeating rate upon which they wish to cook, and the automated cooking system 10 automatically optimizes the dispensing schedule from the freezer 18 and where to perform the cooking within the fryer 12. It will be understood that the food products 14 to be cooked and the production rate may also be communicated to the cooking system 10 by other methods, including wireless communication from order management computer(s) that receive customer demands for food product 14 and facilitate restaurant employees with fulfilling customer demands and orders accordingly. Regardless of how the control parameters are set, the automated cooking system 10 generally operates as follows: it automatically raises the predetermined basket 16, moves the basket 16 to the position to accept the uncooked food product 14, moves the basket 16 to the proper cooking chamber, e.g., fryer vat 42, location, lowers the basket 16 into the cooking medium 44, raises the basket 16 once cooked and moves the basket 16 to be dispensed into the hot holding receiving area 30, and then moves the basket 16 back to a predetermined location at the fryer 12 or back to the freezer 18 to accept more uncooked food product 14.

In an embodiment, the system controller 25 of the automated cooking system 10 may be configured to implement different modes of the system 10 or fryer 12. In any event, the system controller 25 may be operatively coupled to a dispensing mechanism of the dispensing freezer 18 to enable coordination between the dispensing of uncooked food product 14 from the dispensing freezer 18 into the basket 16, such that a predetermined amount of food product 14 is dispensed into the basket 16. The system controller 25 may also interface with other equipment in a fully automated fashion, to cause cooking of food product 14 in response to customer orders or demand. To this end, while the system controller 25 is referred to separately from the gantry control 26 previously described and shown in FIG. 1, it will be appreciated that the gantry control 26 may be an integral part of a single system controller 25 operating all elements of the cooking system 10 without departing from the scope of this invention.

Also initially shown in FIG. 1, the fryer 12 also includes a gantry system 22 that is configured to move a basket 16 between a plurality of positions at the fryer 12. The gantry system 22 includes a gantry 24. The gantry 24 is moved by the gantry system 22 using a motor (not shown) which is controlled using a gantry control 26 enabling the gantry 24 to move to a desired position. The gantry control 26 interfaces with or is part of a system controller 25 (schematically shown in FIG. 1), which is described in greater detail below. The gantry system 22 is configured to service each platform 46 associated with each fryer vat 42 with a basket 16.

Referring now to FIG. 2, an exemplary embodiment of the fryer 12 used in the automatic cooking system 10 is shown. The system 10 includes a frame 50 mounted on a plurality of casters or wheels 52, so that the fryer 12 may be easily moveable on a surface, such as a floor. In one embodiment, one or more of the wheels 52 are lockable to prevent unwanted movement of the fryer 12 during operation. In a further embodiment, the frame 50 includes feet 54 so that the frame 50 of the system 10 is not placed directly onto a surface, such as a floor. In one embodiment, the feet 54 are adjustable such that the system 10 can be raised or lowered to a desired height above a surface, such as a floor. Alternatively, the wheels 52 or feet 54 may be eliminated if desired. A plurality of wall panels 56 are provided on the frame 50 to strengthen the frame 50. Various fryer components such as, for example, oil filtration and recirculation components, may be supported by or housed by the frame 50 within the wall panels 56. These fryer components are of a conventional design, and thus, are not shown in detail in the figures. Cabinets 58 may be located near the bottom of the fryer 12 and may be used to remove already-used cooking medium 44. According to another embodiment, cabinets 58 may be used as storage for unused cooking medium 44 or other products.

With continued reference to FIG. 2, in an embodiment, the fryer 12 includes five fryer vats 42, each configured to hold a cooking medium 44. As shown, each fryer vat 42 is configured to hold at least one basket 16. However, more or fewer fryer vats 42 are also envisioned, with each fryer vat 42 being configured to hold one or more baskets 16. For example, the fryer 12 may feature three fryer vats 42 wherein each fryer vat 42 is configured to accommodate two platforms 46 (and thus two cooking baskets 16) each, for a total of six platforms 46 and six baskets 16. At least one heating element 48 is disposed within each fryer vat 42. However, it is envisioned that each fryer vat 42 may include any suitable number of heating elements 48 in any arrangement, as may be desired. The heating element 48 is configured to heat the cooking medium 44 to a predetermined temperature so as to cook the food products 14 therein. Further, in an embodiment the fryer 12 includes vertical transport assemblies 60, which are configured to raise and lower the baskets 16 into and out of the fryer vats 42 on platforms 46 attached to the vertical transport assemblies 60. It is envisioned that each fryer vat 42 may contain a single basket 16, which is movable on a platform 46 of one of the vertical transport assemblies 60. Alternatively, a fryer vat 42 may accommodate two or more baskets 16, each moveable on a separate platform 46 on a separate vertical transport assembly 60. It is also envisioned that a basket 16 may be used with different fryer vats 42 or different platforms 46 of the vertical transport assemblies 60. Mounted in the rear of the frame 50 are the motors and other corresponding components (not shown) for each of the vertical transport assemblies 60.

Figure 3:
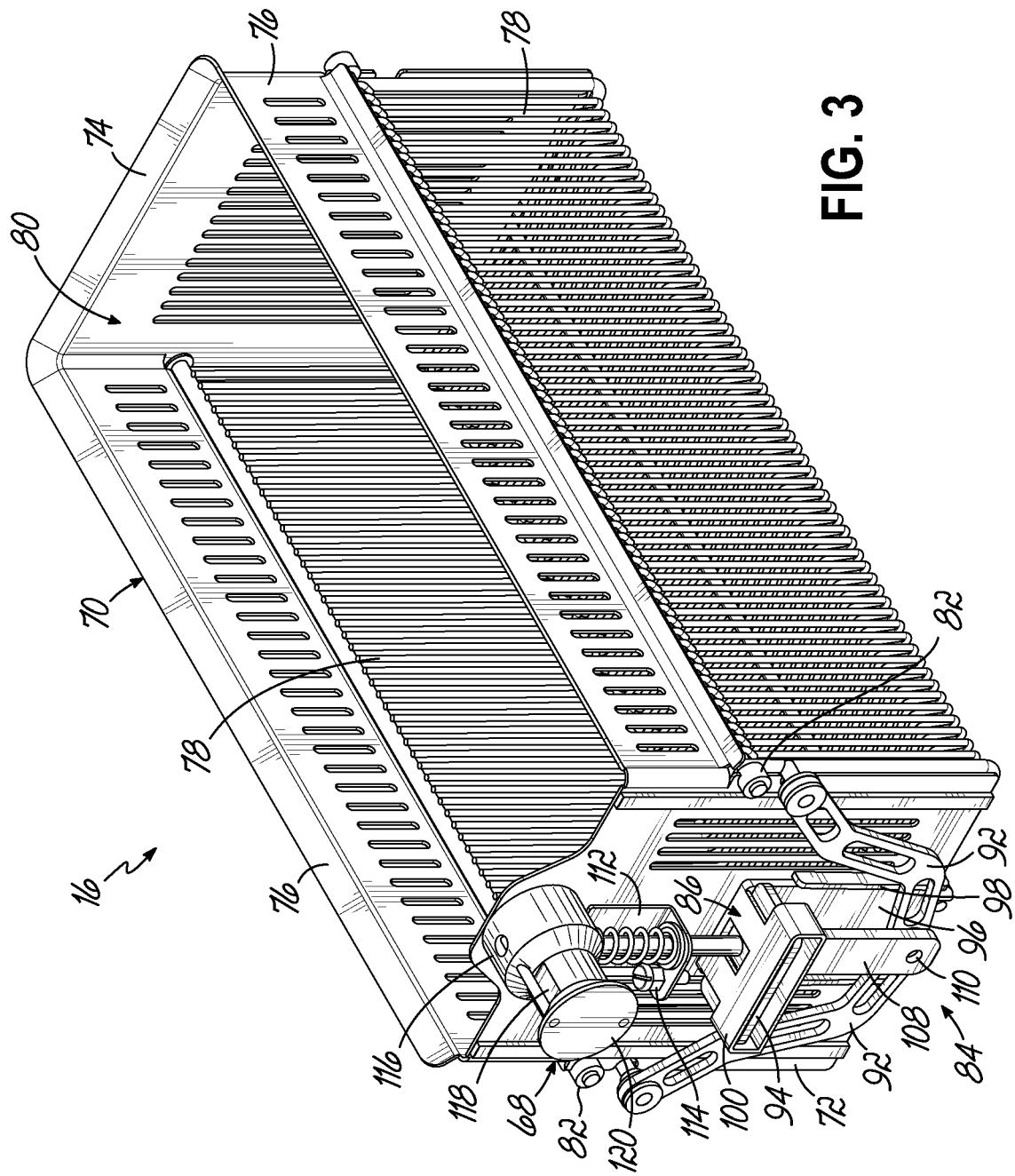
FIG. 3 is a front perspective view of a fryer basket in accordance with an embodiment of the invention.

Referring now to FIGS. 3-6B, these Figures illustrate an exemplary embodiment of the basket 16. As shown in FIG. 3, the shape of the basket is defined by the basket frame 70. The basket frame 70 is made up of a series of connected panels—the front panel 72, the back panel 74, and two side panels 76. The panels 72, 74, 76 are connected to each other at or near their sides edges. Specifically, the front panel 72 is connected at one edge to a side panel 76 and at an opposing edge to a different side panel 76. Similarly, the back panel 74 is connected at one edge to a side panel 76 and at an opposing edge to a different side panel 76. Together, the panels 72, 74, 76 form a rectangular cuboid shape with two opposing open faces—the top and the bottom of the basket frame 70. It is to be understood that other constructions and shapes of the basket 16 are possible. Further, it is to be understood that the front 72, back 74, and side panels 76 could be different sizes from one another depending on a user's needs or preferences. For example, FIG. 3 shows that the side panels 76 of the basket 16 are significantly shorter than the front and back panels 72, 74. In the pictured embodiment, the side panels 76 are shortened to allow for the addition of angled panels 78, described in further detail below. Regardless of the shape or construction of the basket frame 70, the interior of the connected panels 72, 74, 76 defines the bounds of a storage space 80 therein. The storage space 80 is used to, for example, hold food product 14.

Completing the bounds of the storage space 80 of the basket 16 are the two angled panels 78. Each angled panel 78 is roughly L-shaped. It is to be understood that the angled panels 78 could be differently shaped and still perform the function described herein. An angled panel 78 is coupled to and extends from each of the side panels 76. Specifically, an angled panel 78 extends downwardly from a side panel 76 and then extends inwardly, towards a center of the basket 16 along a bottom face of the basket 16. The angled panels 78 are coupled to the side panels 76 and are configured to pivot about their couplings 82—between a closed position and an open position. In the closed position, the edges of the angled panels 78 are approximately coextensive with the edges of the front and back panels 72, 74 such that they, collectively, define a closed bottom of the storage space 80. Further, the edges of the angled panels 78 meet each other roughly in the middle of the bottom face of the basket 16. Thus, in the closed position the angled panels 78 form the bounds for the bottom and part of the sides of the basket 16 to prevent food product 14 from falling out of the basket 16. Transitioning from the closed position to the open position, the angled panels 78 pivot about their couplings 82 to extend outwardly from the side panels 76 to form an opening in at least the bottom of the basket 16. The opening may also extend to the side of the basket 16 depending on where the angled panels 78 are coupled to the side panels 76. Regardless, with the angled panels 78 in the open position food product 14 in the basket 16 will exit the basket 16 through an opening in at least the bottom of the basket 16 formed by the absence of the angled panels 78 (e.g., the angled panels 78 no longer form a bottom of the basket 16). When the angled panels 78 are in the open position, the baskets 16 are configured such that food product 14 will exit the basket 16 in less than 10 seconds. Specifically, the baskets 16 are configured to be emptied of food product 14 in less than 5 seconds. Such rapid evacuation of the food product 14 from the basket 16 when the angled panels 78 transition from the closed position to the open position offers an advantage over some other baskets known in the art.

Still referring to FIG. 3, a product discharge mechanism 84 is positioned on the front panel 72 of the basket 16. The product discharge mechanism 84 functions to control the position of the angled panels 78—which in turn determines if and when the basket 16 will discharge food product 14. Specifically, the product discharge mechanism 84 is responsible for changing the position of the angled panels 78 from a closed position to an open position and vice versa. The product discharge mechanism 84 is coupled to both of the angled panels 78 such that actuating the product discharge mechanism 84, in turn, causes the angled panels 78 to change position (e.g., from closed to open or vice versa). The product discharge mechanism 84 is biased to keep the angled panels 78 in the closed position until the product discharge mechanism 84 is actuated. Actuating the product discharge mechanism 84 generates pivotal movement of the angled panels 78 about their couplings 82 such that the angled panels 78 move away from each other into an open position. In the open position, the angled panels 78 no longer form the bottom face of the storage space 80 of the basket 16. In other words, in the open position an opening or void is created in the bottom of the basket 16. Thus, when the angled panels 78 are in the open position, the food product 14 can exit the basket 16, for example into the hot holding receiving area 30. Further, when the product discharge mechanism 84 is not actuated, the product discharge mechanism 84 returns the angled panels 78 to the closed position—thereby creating a bottom 'floor' for the basket 16—so that more food product 14 can be deposited into the storage space 80 of the basket 16.

Still referring to FIG. 3, located near the top of the front panel 72 of the basket 16 and connected to the product discharge mechanism 84 is the pickup point 68. The pickup point 68 is described in greater detail below with respect to FIGS. 7A-7C. Briefly, the pickup point 68 is configured to be gripped, for example, by the clamping gripper 66 so that the basket 16 can be moved from location to location within the automated cooking system 10. Features of the pickup point 68 provide for greater ease of handling and enhanced stability when gripping and transporting the basket 16 by the pickup point 68.

Figure 4:
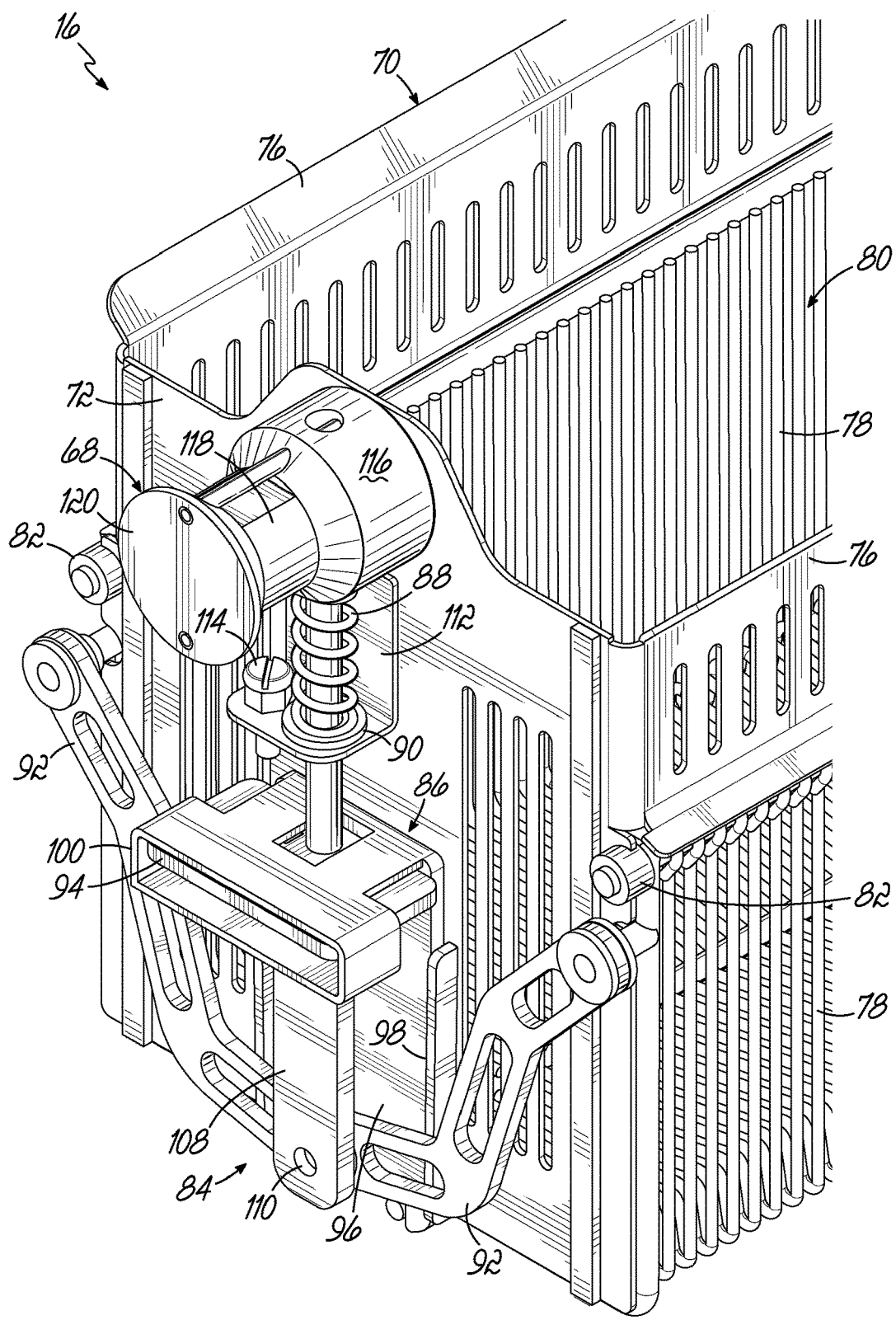
FIG. 4 is a front perspective detail view of a fryer basket, similar to FIG. 3.

Turning to FIG. 4, the Figure shows the product discharge mechanism 84 in greater detail. Generally, the product discharge mechanism 84 serves to maintain the angled panels 78 in a closed position until the product discharge mechanism 84 is actuated. When actuated, the product discharge mechanism 84 moves the angled panels 78 from the closed position to an open position. After actuation, the product discharge mechanism 84 moves the angled panels 78 back to the closed position from the open position.

The product discharge mechanism 84 features a member 86 that is movably fixed to the front surface of the front panel 72 of the basket. In an embodiment, the member 86 is configured to move up and down. In an alternative arrangement, the member 86 could move in a different direction. A biasing element 88 is located at an end of the member 86. For example, in FIG. 4 the biasing element 88 is located at a top end of the member 86. It is to be understood that the biasing element 88 could be in a different location. Regardless, the purpose of the biasing element 88 is to keep the member 86 from moving until the member 86 is acted upon with sufficient force as to overcome the bias and actuate the discharge mechanism 84. Here, the biasing element 88 keeps the member 86 in place at a lower position relative to the front panel 72 and, thus, keeps the angled panels 78 closed until the member 86 is acted upon (e.g., until the product discharge mechanism 84 is actuated). To keep the member 86 in the lower position, the biasing element 88 works in conjunction with a shoulder 90, mounted on the member 86. The biasing element 88 exerts a force on the shoulder 90 which must be overcome in order to displace the member 86 from its lower position. The biasing element 88 may be a tension or compression spring that exerts a restoring force on the shoulder 90. It is to be understood that other constructions are possible. To displace the member 86, the restoring force must be overcome with a greater force acting in an opposing direction. Until the force exerted by the biasing element 88 on the shoulder 90 is overcome, the member 86 will remain unmoved in a lower position.

Still referring to FIG. 4, the linkage arms 92 connect the member 86 to each of the angled panels 78. Specifically, each linkage arm 92 is fastened at one end of the linkage arm 92 to an end of the member 86 opposite the location of the biasing element 88. The opposing ends of the linkage arms 92 (e.g., the ends not connected to the member 86) are fastened to the angled panels 78, respectively. The fasteners may be any suitable mechanical fastener or other appropriate fastener. Because the linkage arms 92 are fastened to the member 86 and the angled panels 78, movement of the member 86 results in movement of the angled panels 78 through the linkage arms 92. It is to be understood that alternative arrangements of the linkage arms 92 relative to the product discharge mechanism 84 are contemplated.

To facilitate actuation of the product discharge mechanism 84, the member 86 includes a collar 94. The collar 94 is located on the member 86 between the biasing element 88 (e.g., located at one end of the member 86) and the fastened linkage arms 92 (e.g., at an opposing end of the member 86). In other words, the member 86 is located roughly in the middle portion of the member 86. Other arrangements in alternative embodiments are possible. The collar 94 is connected to the member 86 such that moving the collar 94 (e.g., in an upwards direction) moves the member 86 in the same direction that the collar 94 is moved. For example, raising the collar 94 moves the member 86 upwards and acts against the bias (e.g., compresses the spring) of the biasing element 88. In turn, the linkage arms 92 are also moved which causes the angled panels 78 to transition from a closed position to an opened position to allow food product 14 to exit the basket 16. In short, the collar 94 serves as an interaction point between the product discharge mechanism 84 and the gantry 24.

With continued reference to FIG. 4, the product discharge mechanism 84 also includes an L-shaped plate 96. The L-shaped plate 96 fits within a channel 98 defined on the front surface of the front panel 72 and interacts with the member 86—particularly, with the collar 94. Like the member 86, the L-shaped plate 96 is constrained (e.g., by the channel 98) to move only up and down. An end of the L-shaped plate 96 includes a substantially U-shaped enclosure 100 that interacts with and at least partially surrounds the collar 94 portion of the member 86. The interaction between the L-shaped plate 96 (specifically, the U-shaped enclosure 100) and the collar 94 is such that moving the L-shaped plate 96 up or down will cause the collar 94 (and therefore the member 86) to move in the same direction as the L-shaped plate 96. Further, the end of the L-shaped plate 96 opposite that of the U-shaped enclosure 100 features a cut-out area 102. The cut-out area 102 is configured to accept extended portions 104 of the angled panels 78 that extend into the plane of the front panel 72 of the basket 16. Such is shown more clearly, for example, in FIG. 5A. By capturing the ends of the extended portions 104 of the angled panels 78, the cut-out area 102 serves to help keep the angled panels 78 in a closed position until the product discharge mechanism 84 is actuated.

In an embodiment, the member 86 also includes a rod 106 that forms an end of the member 86—specifically, the same end of the member 86 that features the biasing element 88. An end of the rod 106 is connected to the underside of the pickup point 68. Near that end of the rod 106, the shoulder 90 is mounted at a position on the rod 106. The biasing element 88 is located between the pickup point 68 and the shoulder 90. It is to be understood that alternative arrangements are contemplated. When the member 86 is moved upwards, the biasing element 88 is compressed between the pickup point 68 and the shoulder 90. When compressed, the biasing element 88 exerts a restorative force to urge the member 86 to return to its previous, lower position. Such a force is continually exerted until the member 86 is returned to its lower position. Further, the opposing end of the rod 106 is connected to the collar 94 to form a portion of the member 86.

Still referring to FIG. 4, the member 86 further includes a mating plate 108 that forms an end of the member 86—specifically the end of the member 86 opposite that of the biasing element 88. The mating plate 108 connects the linkage arms 92 to the collar 94. One end of the mating plate 108 is connected to the collar 94 to form a portion of the member 86. The mating plate 108 may be connected to the collar 94 on a face opposing that which the rod 106 is connected to. The mating plate 108, at an opposite end (e.g., the end away from the collar 94), features an aperture 110. The aperture 110 is used to secure the linkage arms 92 to the member 86. A fastener can be passed through the aperture 110 in the mating plate 108 and the ends of the two linkage arms 92 to fasten the linkage arms 92 to the mating plate 108. When fastened to the mating plate 108 (and thus the member 86), the linkage arms 92 will move with the member 86 when the product discharge mechanism 84 is actuated.

Figure 5A:
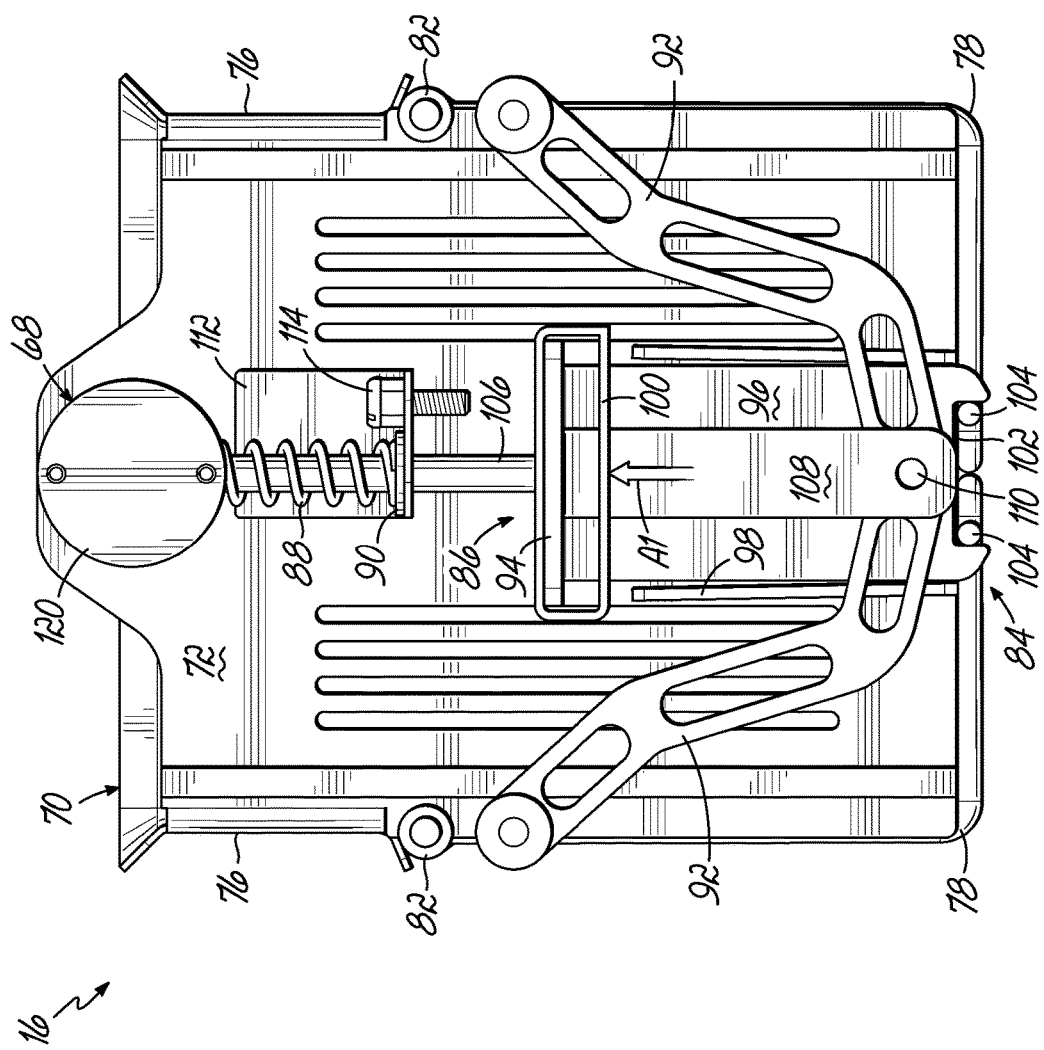
FIG. 5A is a front view of a fryer basket, showing the angled panels in a closed position.
Figure 5B:
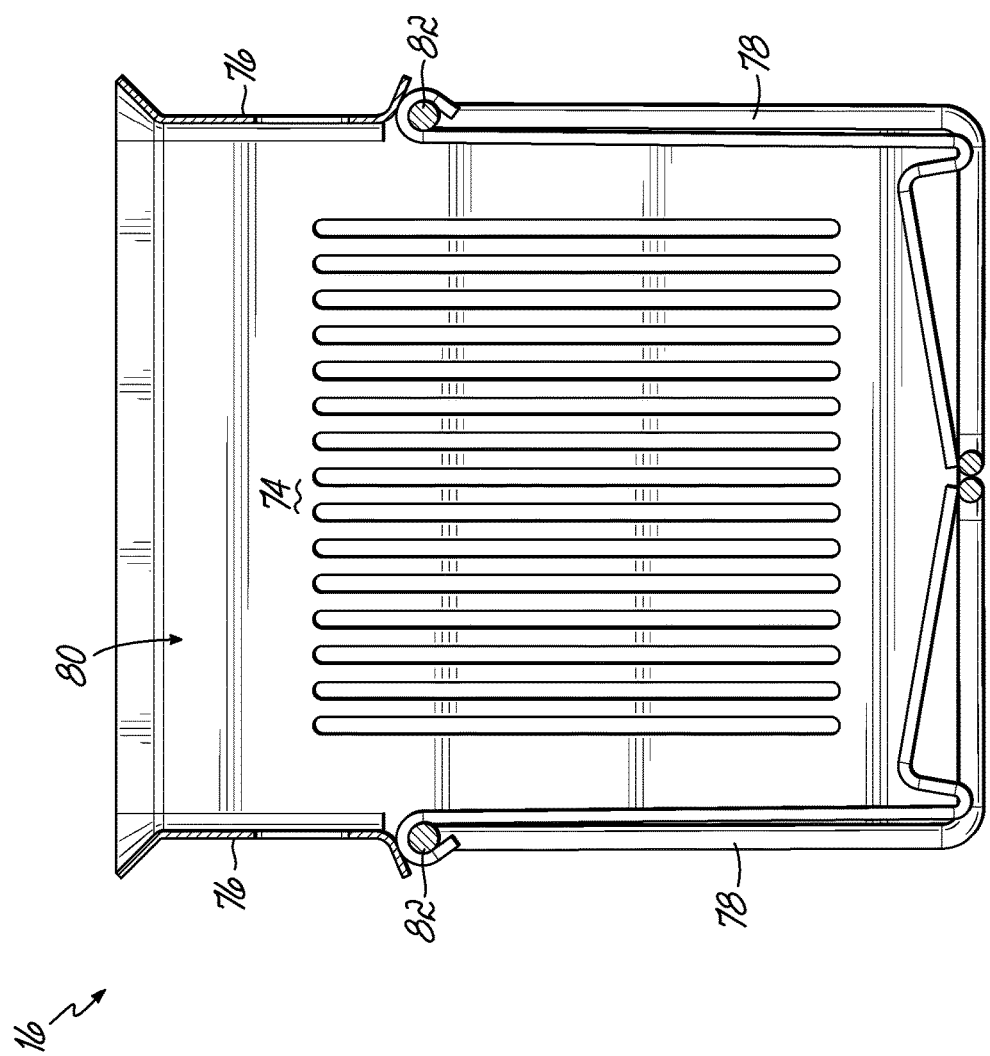
FIG. 5B is a rear view of the fryer basket of FIG. 5A.

FIGS. 5A and 5B show the basket with the angled panels 78 in the closed position. Specifically, FIG. 5A more clearly shows some details of the product discharge mechanism 84 and interactions of the product discharge mechanism 84 with the angled panels 78. The Figure shows the cut-out area 102 of the L-shaped plate 96 and the ends of the extended portions 104 of the angled panels 78 captured within the cut-out area 102. As explained above, the cut-out area 102 aids in maintaining the angled panels 78 in a closed position until the product discharge mechanism 84 is actuated. Further, arrow A1 shows how the U-shaped enclosure 100 and collar 94 will move once the product discharge mechanism 84 is actuated. Specifically, both the U-shaped enclosure 100 and the collar 94 will move upwards in the direction of the member 86. Further, FIG. 5A shows a bracket 112 fastened to the front surface of the front panel 72. The bracket 112 serves as a guide for the member 86—particularly, for the rod 106 of the member 86. Further, the bracket 112 can serve as a resting surface for the shoulder 90 when the product discharge mechanism 84 has not been actuated. The bracket 112 further features a stopper 114 to prevent the U-shaped enclosure 100 and collar 94 from travelling too far upwards when the product discharge mechanism 84 is actuated. The stopper 114 can be in the form of a bolt or other mechanical fastener fastened to the bracket 112. It is to be understood that the stopper 114 could take on other forms as well. Further, FIG. 5B shows the rear of the basket 16 when the angled panels 78 are in the closed position.

Figure 6A:
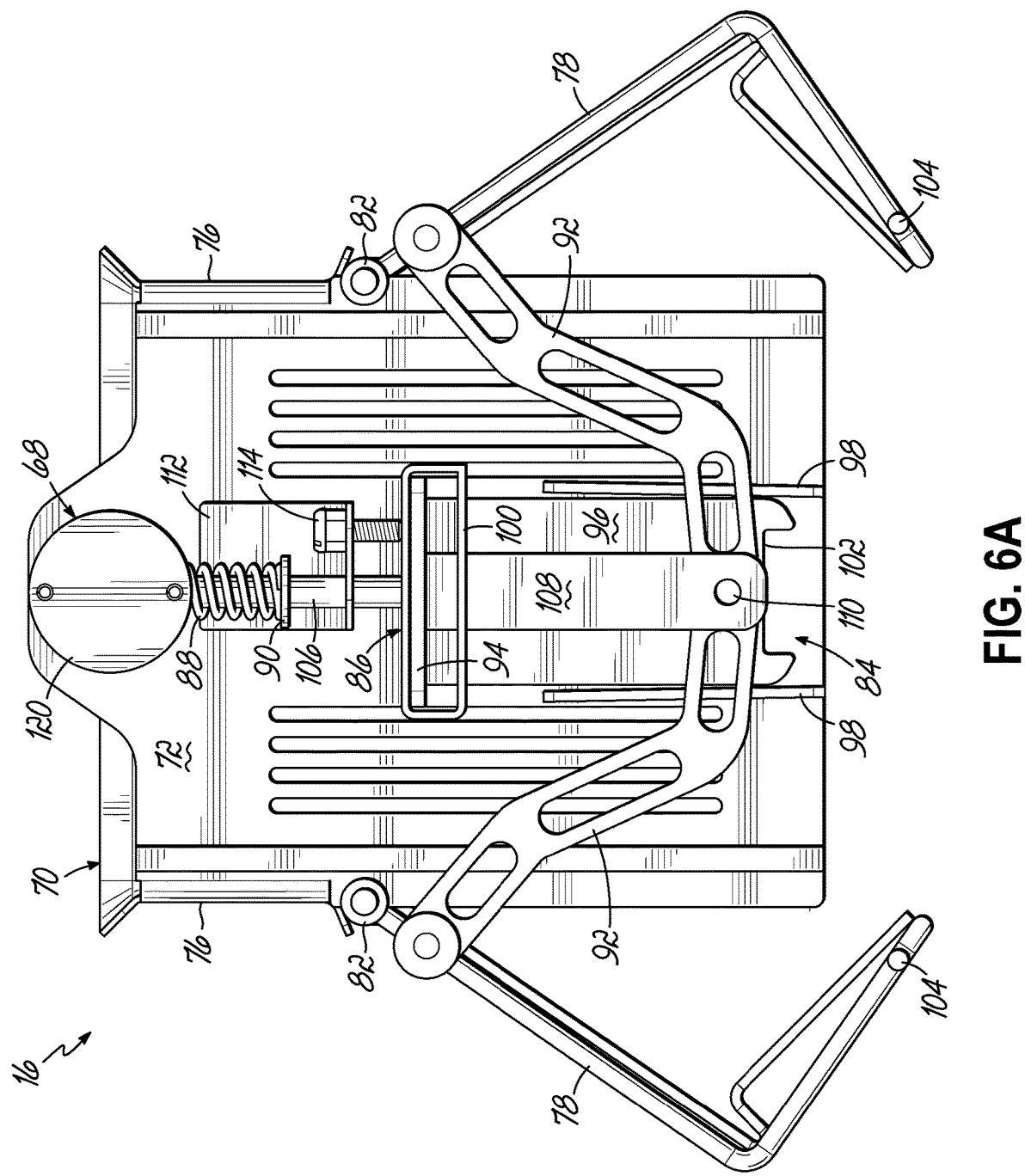
FIG. 6A is a front view of a fryer basket similar to FIG. 5A, showing the product discharge mechanism actuated and the angled panels in an open position.
Figure 6B:
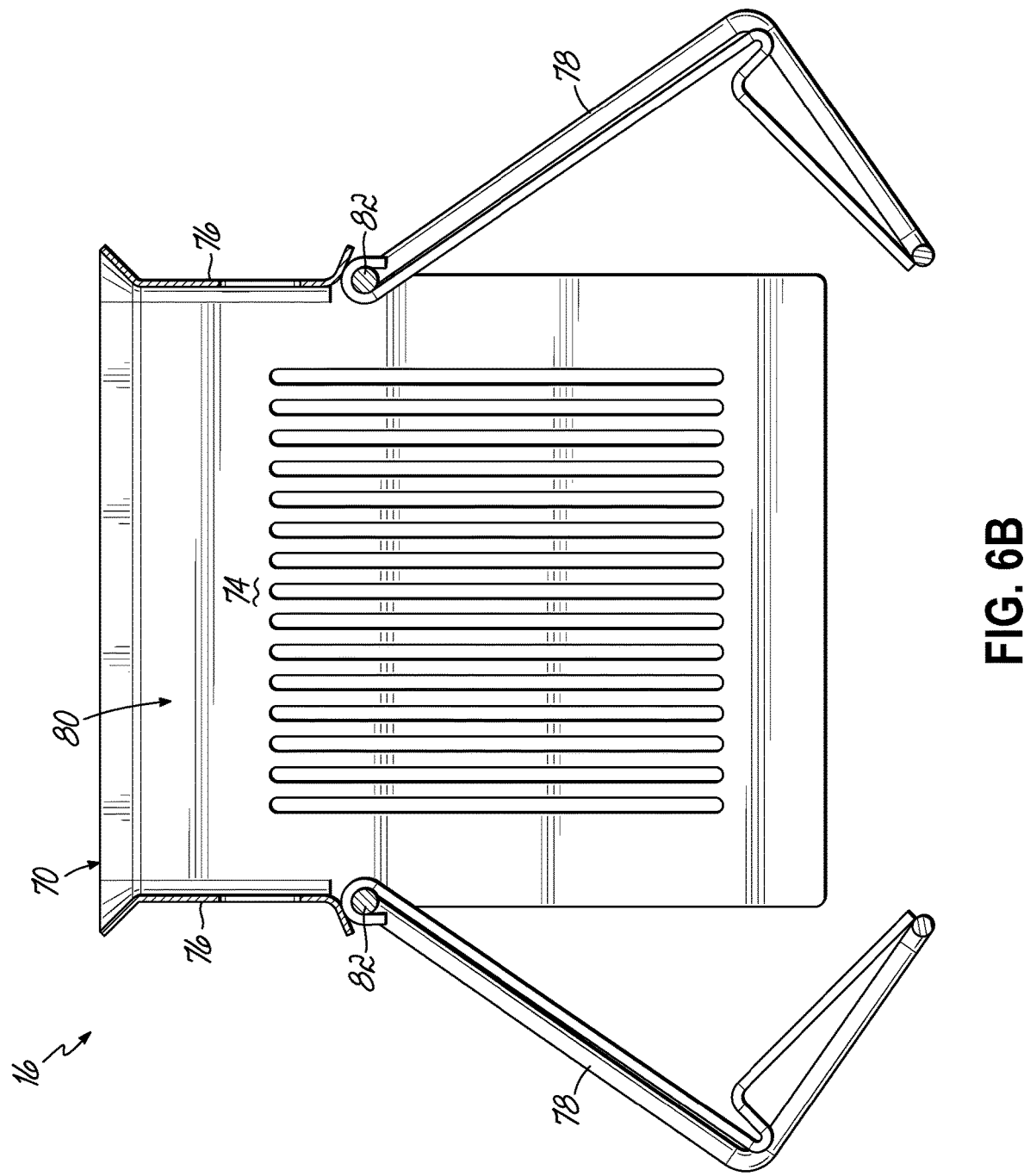
FIG. 6B is a rear view of a fryer basket, similar to FIG. 5B, showing the angled panels in an open position.

Referring now to FIG. 6A, the Figure shows the front of the basket 16—and specifically the product discharge mechanism 84—when the angled panels 78 are in an open position. As can be seen from the Figure, after the product discharge mechanism 84 is actuated, the member 86 moves upwards. The collar 94 and U-shaped enclosure 100 approach and may contact the stopper 114 attached to the bracket 112. The shoulder 90, previously near or resting on the surface of the bracket 112, moves upwards away from the bracket 112 and the biasing element 88 is compressed between the pickup point 68 and the shoulder 90. As a result of the actuation of the product discharge mechanism 84, the extended portion 104 of the angled panels 78 are released from the cut-out area 102 of the L-shaped plate 96 and the angled panels 78 are moved to the open position by the linkage arms 92. In this position, food product 14 in the basket 16 can exit the basket 16, for example, into the hot holding receiving area 30. Further, FIG. 6B shows the rear of the basket 16 when the angled panels 78 are in the open position.

Figure 7A:
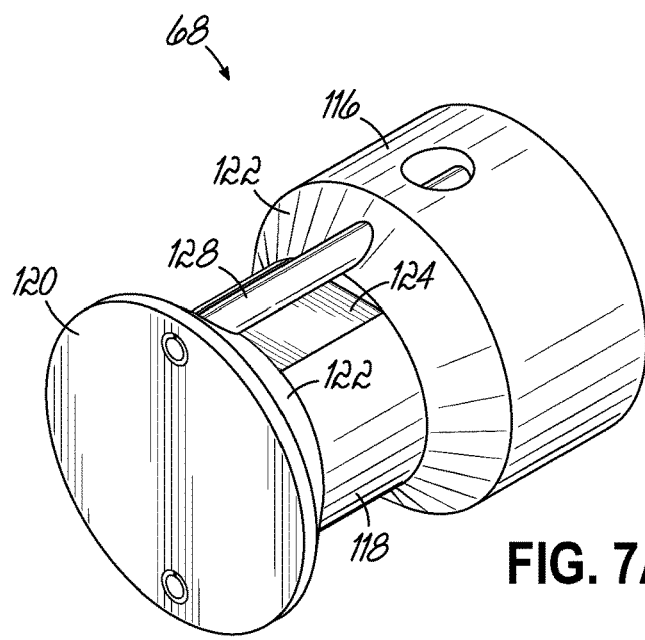
FIG. 7A is a front perspective view of a pickup point in accordance with an embodiment of the invention.
Figure 7B:
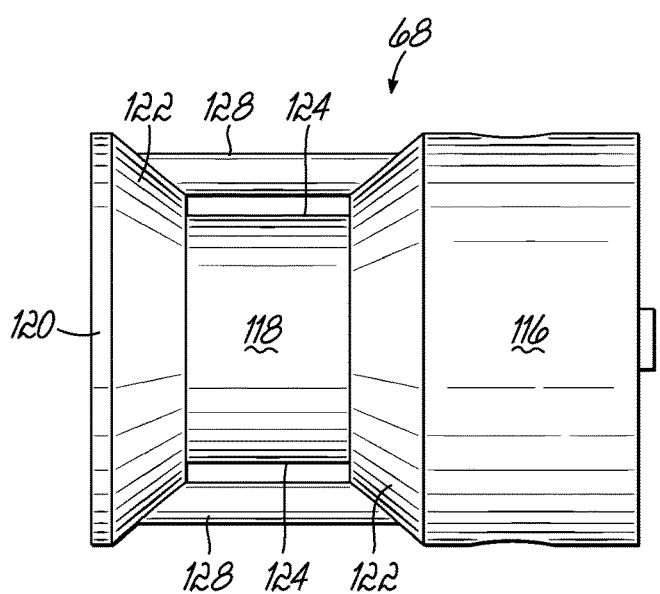
FIG. 7B is a side view of the pickup point of FIG. 7A.
Figure 7C:
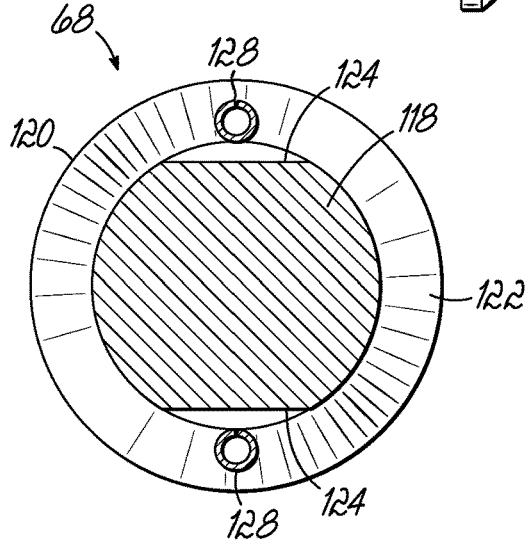
FIG. 7C is a front cross-sectional view of the pickup point of FIG. 7A.

Referring to FIGS. 7A-7C, the Figures show an embodiment of a pickup point 68 of a basket 16. The pickup point 68 is in the form of a spool that may be grasped by the clamping gripper 66, as shown and described in relation to FIGS. 8A and 8B. The pickup point 68 includes a cylindrical main body 116. The main body 116 connects the pickup point 68 to the front surface of the front panel 72 of the basket 16. Extending outwardly from the main body 116 is the cylindrical neck portion 118 of the pickup point 68. In an embodiment, the neck portion 118 is smaller is diameter than the main body 116. The neck portion 118 is the part of the pickup point 68 intended to be gripped, for example, by the clamping gripper 66. Extending outwardly from the neck portion 118 is the cylindrical head portion 120. In an embodiment, the head portion 120 is greater in diameter than the neck portion 118. Further, the head portion 120 may be similar in diameter to the main body 116. The neck portion 118 being smaller in diameter than the main body 116 and the head portion 120 is intended to make it easier to grip the neck portion 118. Further, the main body 116 and the head portion 120 may be tapered inwards towards the neck portion 118 to further aid in gripping the neck portion 118. Moreover, tapered portions 122 of the main body 116 and head portion 120 will help to correct potential misalignment of the clamping gripper 66 when the clamping gripper 66 initiates contact with the pickup point 68.

Further, in an embodiment the pickup point 68 includes additional features to increase the stability of the basket 16 when picked up and transported via the pickup point 68. To that end, in an embodiment the neck portion 118 of the pickup point 68 features a flat surface 124 located along a chord of a cross-section of the neck portion 118. For example, the flat surfaces 124 may be located on the top and bottom of the neck portion 118. The flat surfaces 124 help to prevent the pickup point 68 from rotating within the grip of the clamping gripper 66 when picked up to the transported by offering space for the jaws 126 of the clamping gripper 66 to rest. To further prevent the pickup point 68 from rotating within the grasp of the clamping gripper 66, dowels 128 are added on the top and bottom of the pickup point 68. For example, in an embodiment the dowels 128 may extend over the flat surfaces 124. The dowels 128 extend from the head portion 120 to the main body 116 thereby spanning the neck portion 118. Like the flat surfaces 124, the dowels 128 provide a further feature for the clamping gripper 66 to rest against to prevent the pickup point 68 from rotating within the clamping gripper 66.

Figure 8A:
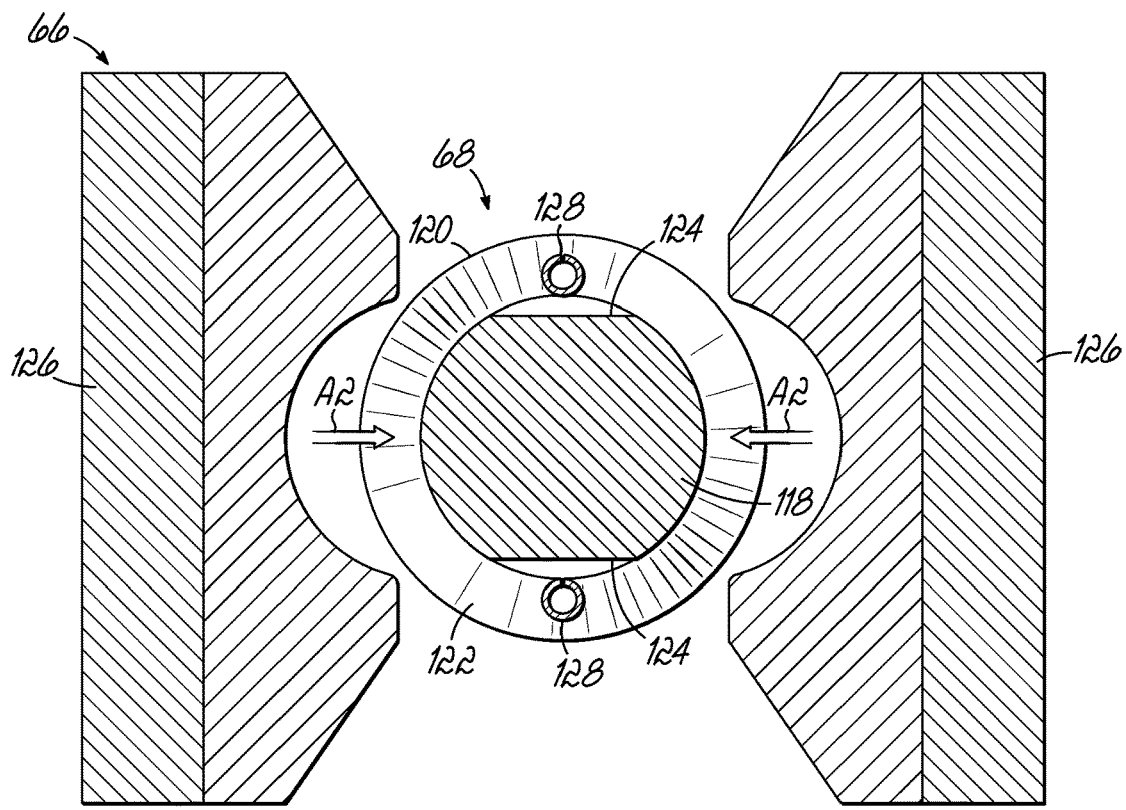
FIG. 8A is a front cross-sectional view of a clamping gripper of the gantry used with the automatic cooking system of FIG. 1, showing the clamping gripper in an open position.
Figure 8B:
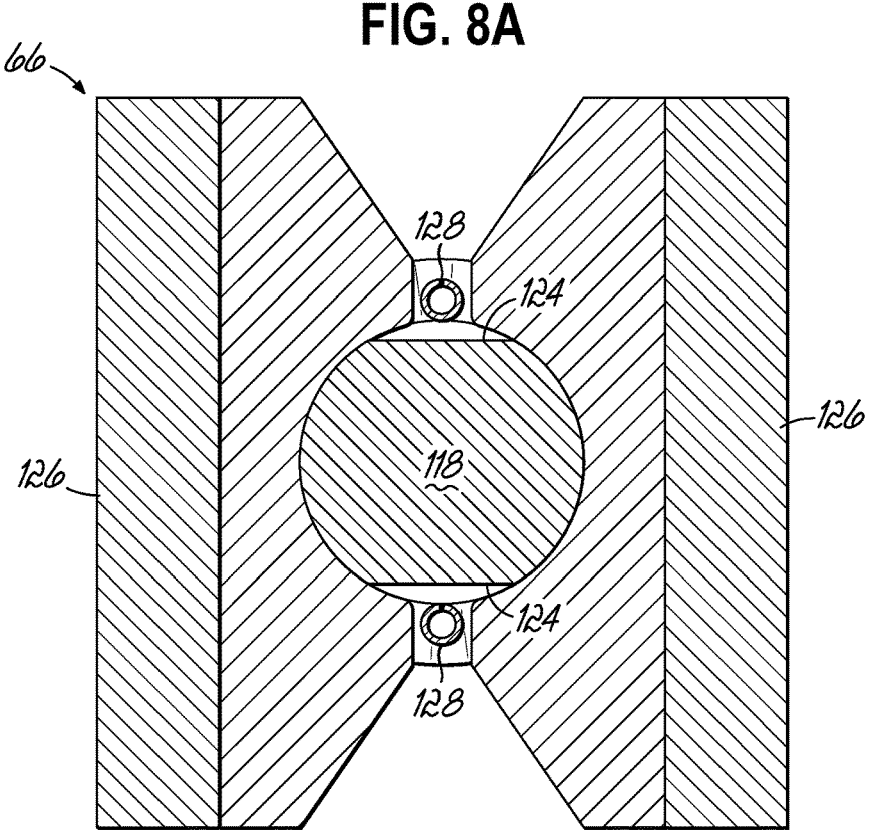
FIG. 8B is a front cross-sectional view of the clamping gripper of FIG. 8A, showing the clamping gripper clamped into engagement with the pickup point of the basket.

Referring now to FIGS. 8A and 8B, these Figures show engagement between the clamping gripper 66 of the gantry 24 and the pickup point 68 of a basket 16 in accordance with the embodiments of this invention. The gantry system 22 includes a gantry 24 which, in turn, includes a clamping gripper 66. In one embodiment, the clamping gripper 66 is a two-piece clamping mechanism which engages with the pickup point 68 of a basket 16 from opposing sides.

As shown in FIG. 8A, the clamping gripper 66 includes a pair of jaws 126. In an embodiment, the jaws 126 are C-shaped and spaced apart from each other a distance equal to or greater than the diameter of the head portion 120 of the pickup point 68. Each jaw 126 of the pair of jaws 126 is arranged on a side of the pickup point 68. Upon receiving a signal from the gantry control 26, the clamping gripper 66 engages with and secures the pickup point 68 of the basket 16 within the clamping gripper 66. When the clamping gripper 66 is activated (as indicated by arrows A2), each jaw 126 engages with a side of the pickup point 68 to snugly sandwich the pickup point 68 between the C-shaped jaws 126—thereby securing the pickup point 68 in the clamping gripper 66. Further, the interior edges of each of the jaws 126 can be contoured to facilitate easier gripping of the pickup point 68. Like the tapered main body 116 and head portion 120 of the pickup point 68 (e.g., as shown in FIGS. 7A-7C), the jaws 126 may similarly be fashioned to allow for the clamping gripper 66 to correct for slight errors in alignment between the basket 16 and the clamping gripper 66. Such tapering and contouring makes it easier for the jaws 126 of the clamping gripper 66 to engage with the pickup point 68, even when the pickup point 68 and clamping gripper 66 are not perfectly aligned. The engagement of the clamping gripper 66 and the pickup point 68 defines a single-location engagement between the gantry 24 and the basket 16 in this embodiment.

As shown in FIG. 8B, the two-piece clamping gripper 66 is clamped into engagement with the pickup point 68. To effectuate the engagement, the clamping gripper 66 may be pneumatically powered. However, it is to be understood that the clamping gripper 66 could be alternatively powered— hydraulically or electrically, for example. In an embodiment, the clamping gripper 66 clamps in engagement with the pickup point 68 in such a way to prevent the basket 16 from uncontrollably rotating when the basket 16 is engaged with the gantry 24 (e.g., when the basket 16 is being moved from one position to another). This engagement of the clamping gripper 66 and the pickup point 68 improves the operation of the gantry 24 and the basket 16 as compared to prior known designs for these reasons, while also enabling just a single pickup point on the basket 16 to be used in this system 10, thereby simplifying the structure needed.

Additional structure may be provided adjacent the pickup point 68 to help avoid any undesirable or uncontrolled pivoting of the basket 16 during engagement and movement with the gantry 24. For example, as shown in FIGS. 7A-7C the pickup point 68 includes dowels 128 that span the distance from the head portion 120 to the main body 116 (above and below the neck portion 118) as well as flat surfaces 124 on the neck portion 118 that provide for more secure engagement between the clamping gripper 66 and the pickup point 68. To that end, the jaws 126 of the clamping gripper 66 engage with the dowels 128 and flat surfaces 124 to help avoid any undesirable or uncontrolled pivoting of the basket 16 during engagement and movement with the gantry 24. In this regard, preventing uncontrolled rotational movements of the basket 16 during engagement with the gantry 24 serves to prevent a basket 16 engaged with the gantry 24 from impacting other baskets 16 at the system 10 or fryer 12, thereby preventing damage to baskets 16, the gantry 24, the fryer 12, or the system 10, as well as preventing food product spills and/or cycle delays associated with such spills and impacts. The improved speed and basket workflow management is therefore enabled in part by this engagement of baskets 16 with the gantry 24.

Figure 9B:
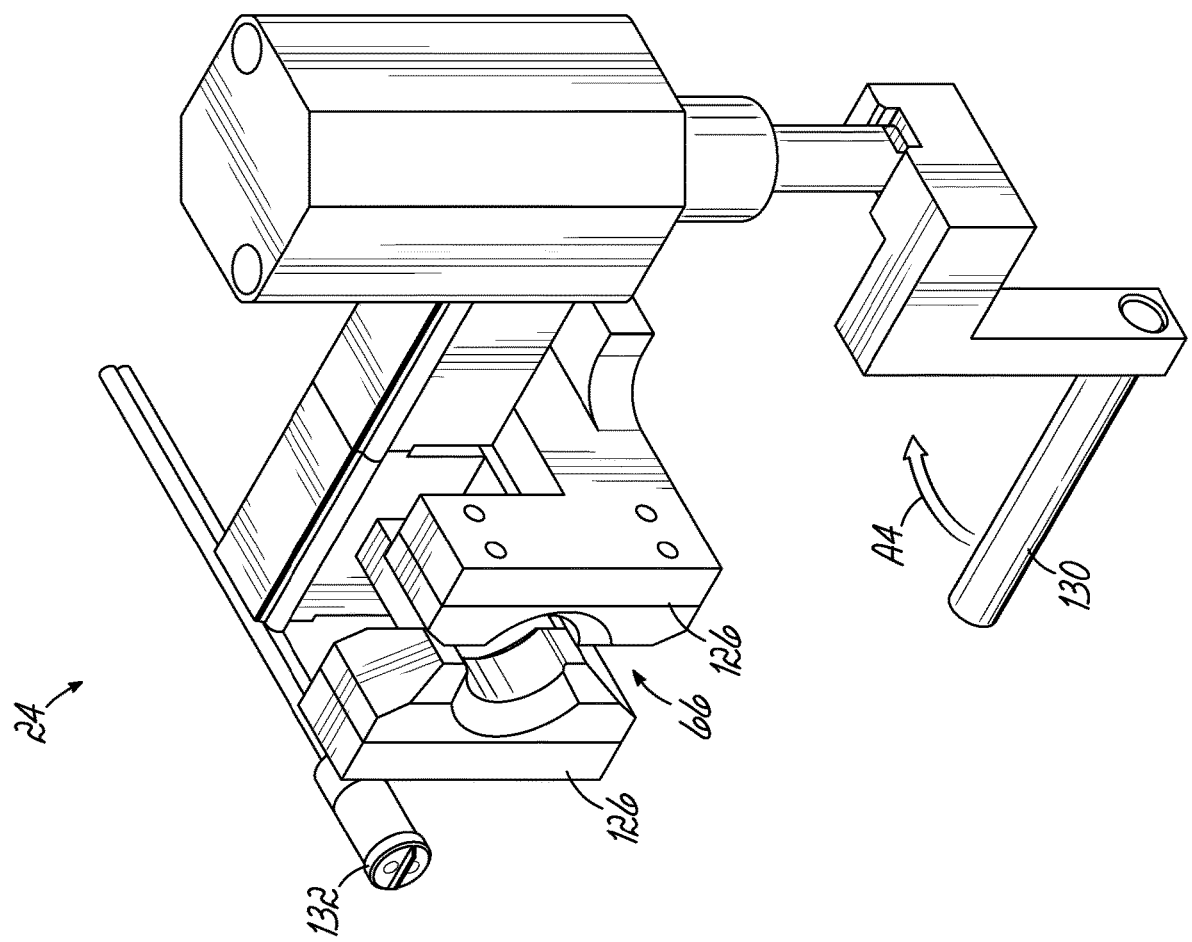
FIG. 9B is a front perspective view of a portion of the gantry of FIG. 9A, showing the actuator arm in a position to interact with a fryer basket.

Referring now to FIGS. 9A and 9B, the Figures show a portion of the gantry 24 in greater detail. Specifically, the Figures show the relationships between clamping gripper 66, actuator arm 130, and basket detection device 132. The clamping gripper 66, actuator arm 130, and basket detection device 132 work in concert to allow for the gantry 24 to pick up and transport baskets 16 as well as to dispense food product 14. In an embodiment, the actuator arm 130 is in the form of an elongated rod that is generally cylindrically shaped, attached to the gantry 24, and located on a side of the clamping gripper 66 and the basket detection device 132 is located on an opposing side of the clamping gripper 66. It is to be understood that alternative arrangements are envisioned. With respect to the actuator arm 130, FIG. 9A shows the actuator arm 130 in a retracted position. In the retracted position, the actuator arm 130 is held away from the basket 16 (e.g., rotated 90° out of the way) to prevent inadvertent contact with the basket 16 that could cause uncontrolled and/or unintended movement and/or openings of the basket 16. Arrow A3 illustrates the transition of the actuator arm 130 from the retracted position to the extended position. In transitioning to the extended position, the actuator arm 130 rotates and moves upwardly with a force to engage with the product discharge mechanism 84.

FIG. 9B shows the actuator arm 130 in the extended position. In the extended position, the actuator arm 130 is positioned to interact with the product discharge mechanism 84 to cause the basket 16 to dispense food product 14. Such interaction is described in greater detail with respect to FIGS. 10A and 10B. Arrow A4 illustrates the transition of the actuator arm 130 from the extended position to the retracted position. Pneumatic power is used to move the actuator arm 130 from the retracted position to the extended position and back, as demonstrated by arrows A3 (in FIG. 9A) and A4 (in FIG. 9B). It is to be understood that the actuator arm 130 could be alternatively powered—hydraulically or electrically, for example.

Referring now to both FIGS. 9A and 9B, the Figures also show the basket detection device 132. The basket detection device 132 is attached to the gantry 24 and is configured to detect the presence of a basket 16 when a basket 16 is located in front of the clamping gripper 66. The basket detection device 132 is used to line up the jaws 126 of the clamping gripper 66 with the pickup point 68 of the basket 16. The basket detection device 132 can take on many forms. For example, in FIGS. 9A and 9B the basket detection device 132 is shown as a laser. However, the basket detection device 132 could also be a proximity switch or a torque sensor. Further, it is to be understood that the basket detection device 132 could take on other forms besides those explicitly described herein.

Figure 10A:
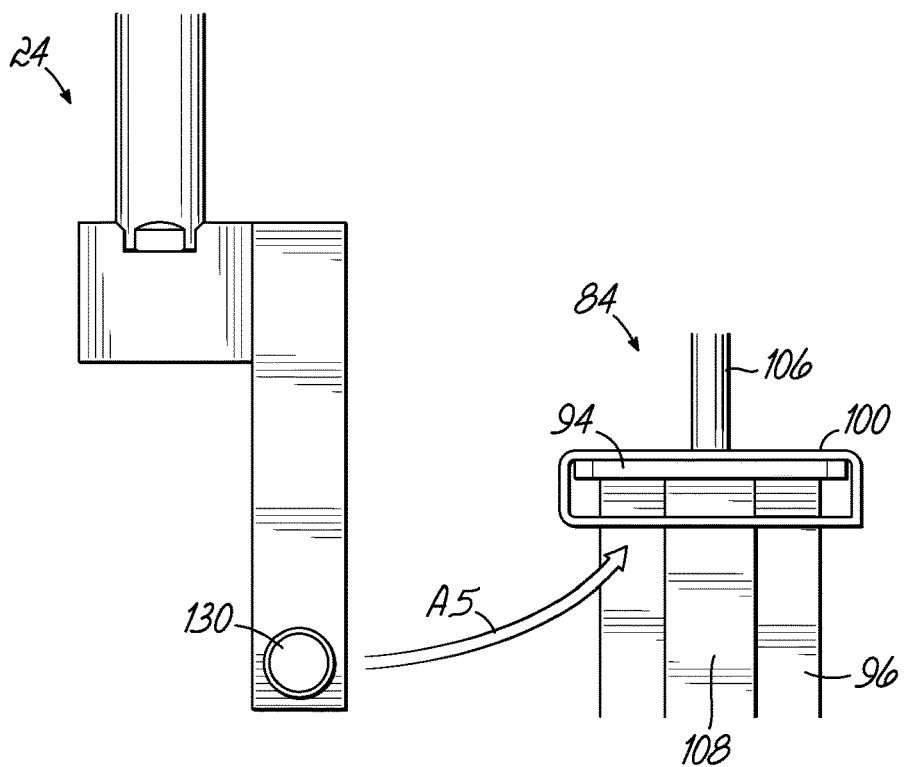
FIG. 10A is a detail view of the interaction between the actuator arm and the discharge mechanism in accordance with an embodiment of the invention.
Figure 10B:
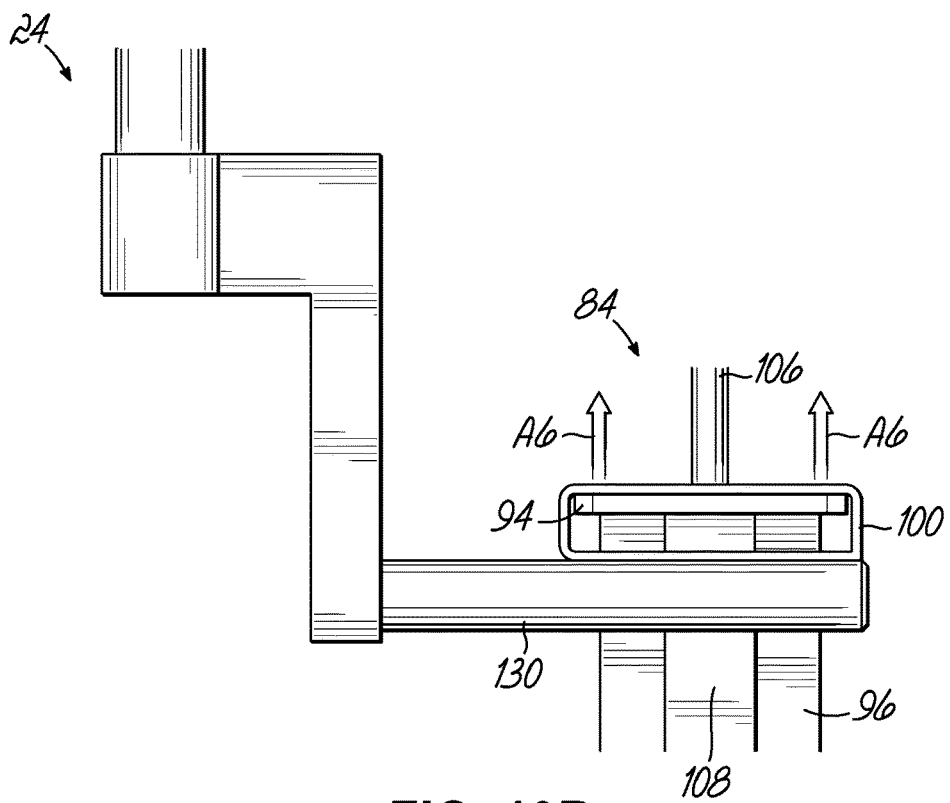
FIG. 10B is a detail view similar to FIG. 10A, showing the actuator arm actuating the discharge mechanism.

Referring now to FIGS. 10A and 10B, the Figures show the interaction between the actuator arm 130 of the gantry 24 and the product discharge mechanism 84 of the basket 16. In FIG. 10A, the actuator arm 130 is in the retracted position—held away from the basket 16 to prevent inadvertent contact with the basket 16. Arrow A5 illustrates the path that the actuator arm 130 will take to interact with the product discharge mechanism 84. Specifically, the actuator arm 130 will rotate 90° towards the basket 16 and move upwards with a force to meet and lift the collar 94, thereby overcoming the bias (e.g., spring bias) of the biasing element 88. Such actions can happen concurrently or in individual stages.

FIG. 10B shows the actuator arm 130 in the extended position and interacting with the product discharge mechanism 84. Specifically, the actuator arm 130 is interacting with an underside of the U-shaped enclosure 100 of the L-shaped plate 96 and raising the U-shaped enclosure 100 (and thus the collar 94 contained therein) upwards—as indicated by arrows A6. It is to be understood that the actuator arm 130 could interact with other parts of the product discharge mechanism 84 in alternate embodiments. For example, the actuator arm 130 could interact directly with the collar 94 in the absence of a U-shaped enclosure 100 in an alternative embodiment. Regardless, the transition of the actuator arm 130 from the retracted position to the extended position and the corresponding interaction with the product discharge mechanism 84 actuates the product discharge mechanism 84. In turn, the angled panels 78 are moved to an open position from a closed position so that food product 14 can be evacuated from the basket 16 (as described in greater detail above).

Referring now to FIGS. 11A-11G, these Figures show a series of steps defining a basket loading cycle and a basket discharge cycle according to embodiments of this invention, each of which may be repeatedly performed to manage basket workflow at the cooking system 10. As evidenced in these workflow Figures, the newly-developed basket-gantry interface of the system 10 described herein helps achieve more reliable and precise movements of the baskets 16 and a quicker cycle time for automated cooking of various food products.

Figure 11A:
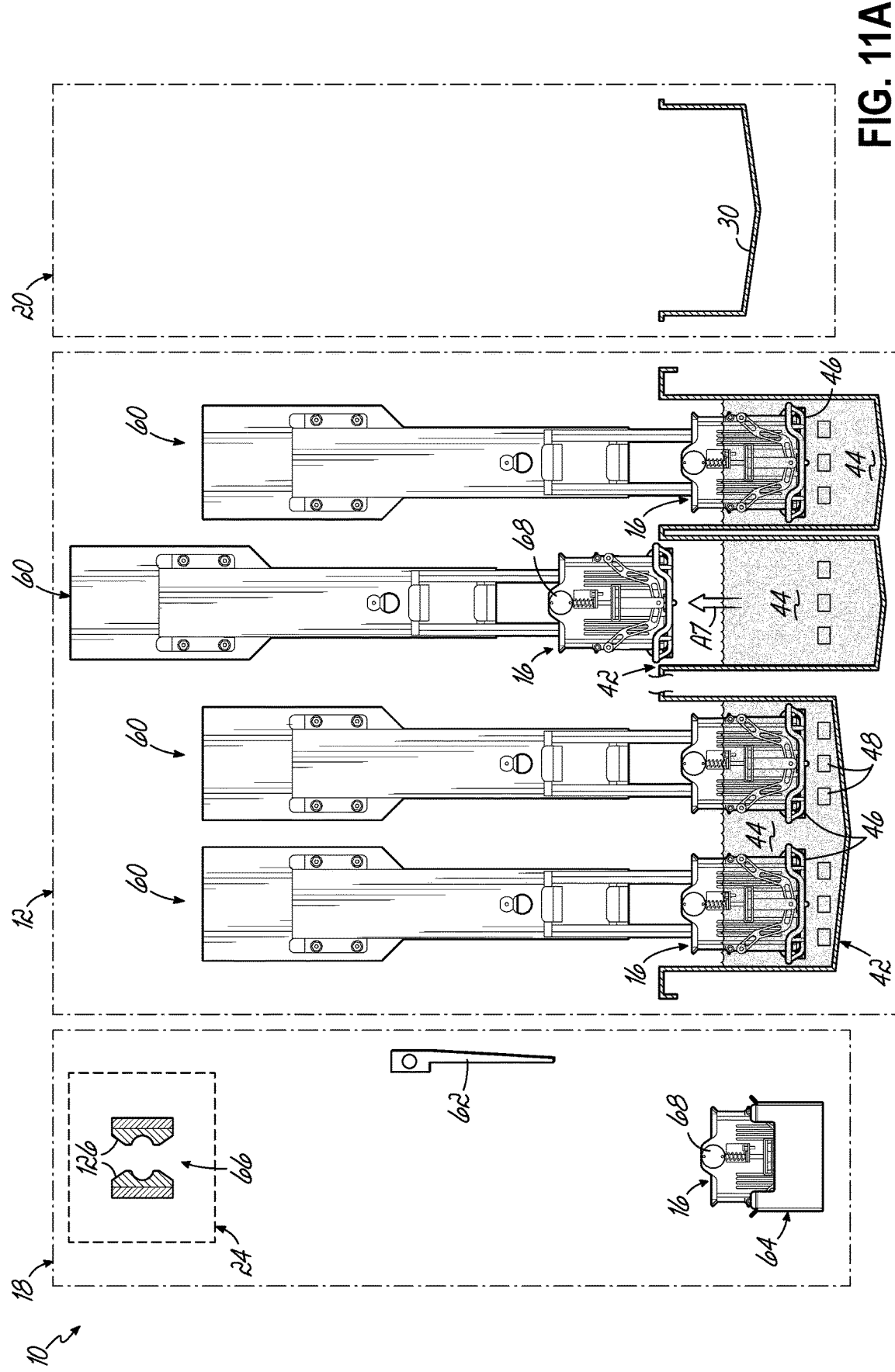
FIG. 11A is a front (partially cross-sectioned) view of a fryer similar to the one shown in FIG. 2, and more particularly showing a plurality of baskets on platforms at various stages of a cooking cycle, an exemplary process of which is shown in this series of Figures.

Referring to FIG. 11A, the Figure shows a basket 16 filled with cooked food product 14 sitting on a platform 46 after exiting a fryer vat 42. At the end of the cooking cycle, the vertical transport assembly 60 lifts the platform 46 on which the basket 16 sits, thus raising the basket 16 from the fryer vat 42 and out of the heated cooking medium 44, as shown, for example, by arrow A7. The basket 16 is waiting to be picked up by the gantry 24, which is shown positioned by the dispensing freezer 18 in FIG. 11A. When the gantry 24 receives a signal from the gantry control 26 and/or system controller 25, the gantry 24 will move to the platform 46 holding the filled basket 16 and engage the basket 16, as described in greater detail below with reference to FIG. 11B. Further, the Figure shows a basket 16 in the basket movement receptacle 64 located at the filling location. At the filling location, the dispenser freezer 18 dispenses uncooked food product 14 into the basket 16 in preparation of transport by the gantry 24 to a fryer 12.

Referring to FIG. 11B, the Figure shows the gantry 24, after receiving a signal from the gantry control 26 and/or system controller 25, engaging with the filled basket 16 on the platform 46. To line up the clamping gripper 66 with the pickup point 68 of the basket 16, the gantry 24 can employ a basket detection device 132 (e.g., proximity switch, torque sensor, laser, etc.) configured to detect the presence of a basket 16 in front of the clamping gripper 66. The basket detection device 132 is addressed in greater detail above with respect to FIGS. 9A and 9B. Once properly lined up, the gantry 24 activates the jaws 126 (e.g., pneumatically) of the clamping gripper 66 and secures the pickup point 68 of the basket 16 between the jaws 126. The engagement of the jaws 126 with the pickup point 68 is described in greater detail with respect to FIGS. 8A and 8B. In general, the clamping gripper 66 is configured to prevent uncontrolled rotational movements of the basket 16 when the basket 16 is transported. Such helps to avoid impacts of the basket 16 with other elements (e.g., other baskets 16, parts of the fryer 12, etc.) of the automated cooking system 10.

Referring to FIG. 11C, the Figure shows the basket 16 filled with cooked food product 14 suspended by the gantry 24 in a position at a height above the hot holding station 20. Further, FIG. 11C shows the gantry 24, upon receiving a signal from the gantry control 26 and/or system control 25, actuating the filled basket 16 to open the bottom of same and thereby discharge the cooked food product 14 into the hot holding receiving area 30 of the hot holding station 20, as shown by arrow A8. Actuation of the product discharge mechanism 84 is described in greater detail above with reference to FIGS. 10A and 10B; however, in short the actuator arm 130 of the gantry 24 interacts with the product discharge mechanism 84 to cause the basket 16 to discharge the cooked food product 14 contained therein.

Further, as shown in the Figure in phantom, the gantry 24 can vary the height above the hot holding station 20 at which this discharge step occurs depending on the specific type of food product 14 contained within the basket 16. For example, one cooked food product 14 may be discharged at a first height while a different cooked food product 14 may be discharged at a different, second height either higher or lower than the first height. Further, cooked food product 14 may be discharged while the basket 16 is moving from a first height to a second height, as shown by arrow A15. Such is helpful if the cooked food product 14 is long and fragile, for example, to prevent the cooked food product 14 from getting damaged by the basket 16 or by the drop impact into the hot holding station 20. Regardless of the discharge height, after discharge from the basket 16 the cooked food product 14 is then held in the hot holding receiving area 30 for further preparation and packaging by an operator.

Furthermore, and still referring to FIG. 11C, the Figure shows the staging shelf 62 preparing for the arrival of an empty basket 16. Sometime before an empty basket 16 arrives at the staging shelf 62, the gantry control 26 and/or system controller 25 sends a signal to the staging shelf 62 so that the staging shelf 62 pivots into a (generally horizontal) deployed position from a stowed position (e.g., as shown in FIGS. 11A and 11B), as illustrated by arrow A9. With the staging shelf 62 in the deployed position, the staging shelf 62 is ready to receive an empty basket 16 from the gantry 24.

Referring to FIG. 11D, the Figure shows the gantry 24, at the direction of the gantry control 26 and/or system controller 25, transporting the basket 16 from a position above the hot holding station 20 (after discharging cooked food product 14) to the staging shelf 62. The gantry 24 disengages with the basket 16 and leaves the basket 16 on the staging shelf 62. The empty basket 16 is then ready to be engaged by the gantry 24 again later when customer demand necessitates.

Figure 11E:
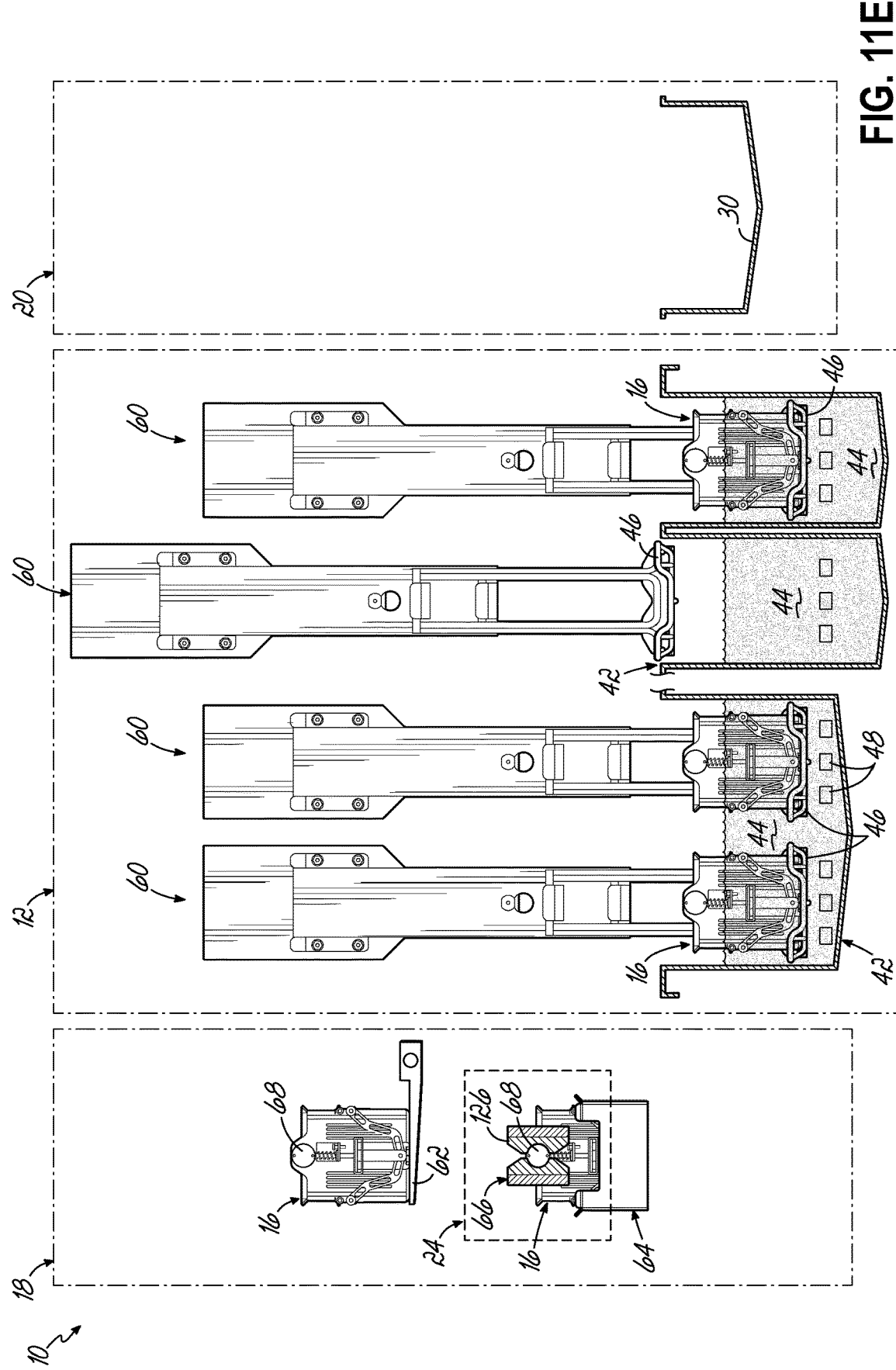
FIG. 11E is a front view similar to FIG. 11A, showing a further stage of the exemplary cooking cycle using the automated cooking system.

Further, FIG. 11D shows a basket 16 in the basket movement receptacle 64 being transported, as indicated by arrow A10. After a basket 16 has been filled by the dispensing freezer 18 at a filling location (as shown starting in FIG. 11A), the basket movement receptacle 64 moves (if necessary) the basket 16 into a pickup position such that the basket 16 is ready to be engaged by the gantry 24. It is to be understood that the filling location and the pickup location may be the same position and thus movement from the filling location to the pickup location may be unnecessary. Once in the pickup position, the filled basket 16 waits in the basket movement receptacle 64 until the basket 16 is engaged by the gantry 24, as shown in FIG. 11E. These movements can occur simultaneous to other actions being taken by the gantry 24 at the fryer 12.

Referring to FIG. 11E, the Figure shows a basket 16 filled with uncooked food product 14 in the basket movement receptacle 64, located in a pickup position adjacent the dispensing freezer 18, being engaged by the gantry 24. After dropping off the empty basket 16 onto the staging shelf 62 (as shown in FIG. 11D), the gantry 24 moves downwardly to the basket movement receptacle 64 to engage the next basket 16.

Figure 11F:
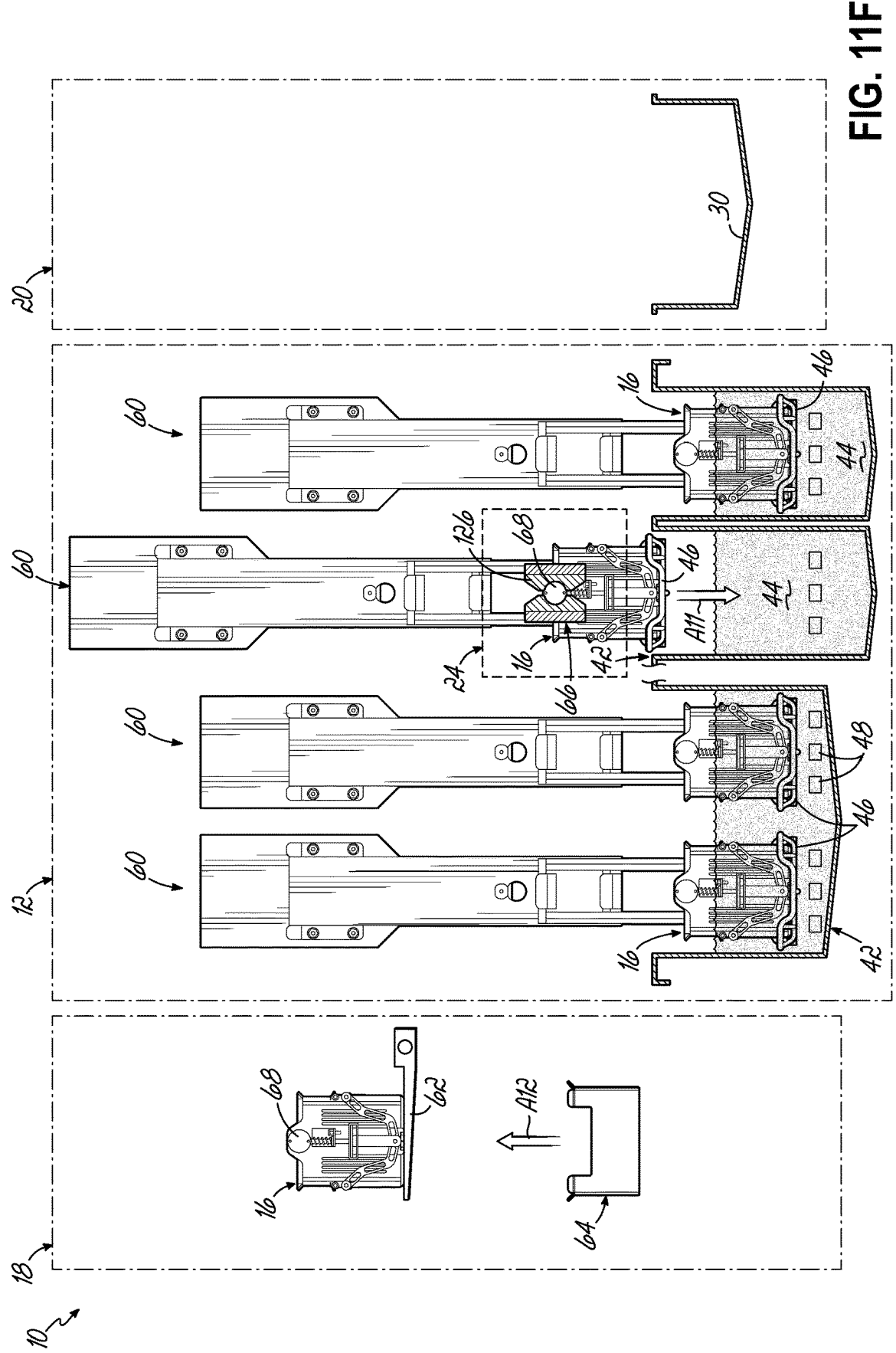
FIG. 11F is a front view similar to FIG. 11A, showing another stage of the exemplary cooking cycle using the automated cooking system.

Referring to FIG. 11F, the gantry 24, after receiving a signal from the gantry control 26, moves the basket 16 from the basket movement receptacle 64 to an open platform 46 above a fryer vat 42. Which platform 46 the basket 16 should be moved to is typically determined by the system controller 25. Note that although a filled basket 16 was previously shown in FIG. 11A at the platform 46 where the gantry 24 places the new basket 16 in FIG. 11F, any available appropriate and available platform 46 could be utilized.

Once the gantry 24 has placed a basket 16 on an open platform 46, the gantry 24 disengages with the basket 16 and leaves the basket 16 on the platform 46 above the fryer vat 42. The platforms 46, on which the baskets 16 sit, are attached to the vertical transport assemblies 60. Upon receiving a signal to initiate a cooking cycle from the system controller 25, the vertical transport assembly 60 then lowers the basket 16, filled with uncooked food product 14, into a cooking medium 44 for a cooking cycle, as shown by arrow A11. These actions can automatically occur at the cooking system 10 while the gantry 24 moves to perform actions on other baskets 16 and platforms 46.

Further, FIG. 11F shows the basket movement receptacle 64 moving upwards, as shown by arrow A12, towards the staging shelf 62 in order to transfer the empty basket 16 on the staging shelf 62 from the staging shelf 62 to the basket movement receptacle 64. The staging shelf 62 can be pivoted to the generally vertical, stowed position to complete the transfer of the basket 16 into the basket movement receptacle 64.

Figure 11G:
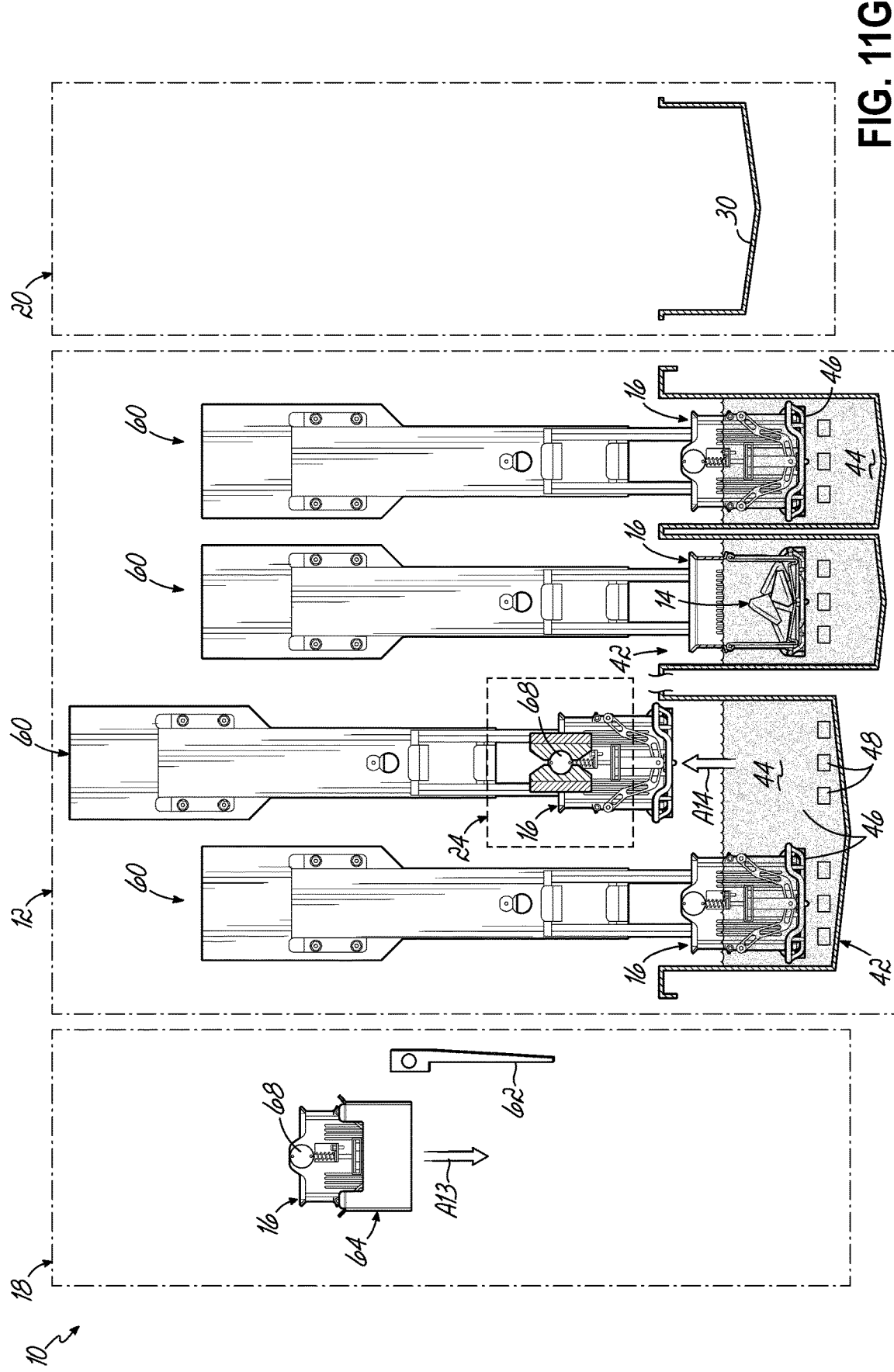
FIG. 11G is a front view similar to FIG. 11A, showing yet another stage of the exemplary cooking cycle using the automated cooking system.

Referring to FIG. 11G, the Figure shows a completed transfer of the basket 16 from the staging shelf 62 to the basket movement receptacle 64. After a successful transition, the basket movement receptacle 64 transports the basket 16 downwardly to the filling location, as indicated by arrow A13. The basket 16 is then filled with uncooked food product 14 and awaits later engagement by the gantry 24 to the bring the basket 16 to a platform 46 above a fryer vat 42. Further, FIG. 11G shows, in the leftmost fryer vats 42, a basket 16 emerging from the cooking medium 44 in a fryer vat 42 (with cooked food product 14), as shown by arrow A14. Once emerged from the fryer vat 42, the basket 16 is engaged by the gantry 24 to be brought to the hot holding station 20 to discharge the cooked food product 14.

Generally, FIGS. 11A-11G show features of the system's 10 basket loading and discharge cycles for managing basket 16 workflow during food preparation at an automated cooking system 10. The automated cooking system 10 prioritizes and orders the basket loading cycles and basket discharge cycles for the gantry system 22 to satisfy varying levels of demand for cooked food product 14 from the automated cooking system 10. This arrangement allows for successful management of up to 6 or more baskets 16 cooking food product 14 simultaneously at the fryer 12, which can result, for example, in throughput levels of 150 pounds of cooked French fries an hour in one operational example. These operational throughput levels are enabled at least in part by the innovative basket-gantry interface described in this application.

It is envisioned that the basket loading and basket discharge cycles could include additional or fewer steps in other embodiments. Nevertheless, the gantry 24 is configured to manage the workflow of 6 or more baskets 16 and cooking stations (platforms 46) at the fryer 12 simultaneously to provide an increased maximum cooking volume throughput of the cooking system 10. The automatic cooking system 10 therefore improves the field of cooking equipment and methodologies by limiting the need for operator intervention (and associate expense) while maximizing how much food product 14 can be cooked and prepared within the standard space used by fryers in commercial setting kitchens. Additionally, as described next, the design of the gantry 24 in this cooking system 10 advantageously controls the baskets 16 during the rapid movements of the basket loading and discharge cycles to avoid uncontrolled pivoting or rotations and/or undesired impacts with other baskets 16 held at the cooking system 10.

Generally, many benefits may arise through use of the automated cooking system 10. The automated cooking system 10 allows the operator to perform other tasks while the automated cooking system 10 is working. Additionally, an automated cooking system 10 allows for improved quality control of the food product 14 (e.g., precise cooking time, more precise weight of product being cooked, optimized heat management by alternating product drops between the various cooking chambers, or synchronized mini-filtration during idle periods). Additionally, the automated cooking system 10 increases the hourly product throughput versus a manually-operated system. Further, the automated cooking system 10 provides superior up-time and predictive fault diagnostics due to continual baseline performance comparisons and configurable warning thresholds.

Additional benefits of the automated cooking system 10 include, for example, an improved operator experience, availability of manual override at any point of the process, easy cleaning (typical cooking chamber cleaning procedure where the actuator surfaces can be easily wiped down), the system 10 fits into customer's current fryer width footprint, the gantry 24 fits under the 64 inch minimum hood clearance, minimal interference with existing fire suppression systems due to the design of the system 10 and fryer 12, making retrofit and site approvals easier, moving parts and controls being shielded from operator and extreme heat, optimized motions allowing for minimal speeds to reduce risk of operator contact, and being retrofittable to existing fryers.

In general overview, the routines executed by the system controller 25 (or a series of control elements as noted above in alternative embodiments), shown for example in FIG. 1, to implement the embodiments of the invention, whether implemented as part of an operating system or a specific application, component, program, object, module, or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

With continued reference to FIG. 1, the program code embodied in any of the applications or modules described herein is capable of being individually or collectively distributed as a program product in a variety of different forms. In particular, the program code may be distributed using a computer-readable storage medium having computer-readable program instructions thereon for causing a processor to carry out the embodiments of the invention.

Computer-readable storage media, which is inherently non-transitory, may include volatile, non-volatile, removable, and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flow-charts, sequence diagrams, or block diagrams. The computer program instructions may be provided to one or more processors of a general purpose computer, a special purpose computer, or another programmable data processing apparatus to produce a machine, such that the instructions, which execute via the one or more processors, cause a series of computations to be performed to implement the functions, acts, or operations specified in the flow-charts, sequence diagrams, or block diagrams.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. An automated cooking system comprising:
   a fryer basket, comprising:
      a frame defining a storage space within the basket, wherein the frame comprises a front surface;
      a pickup point operatively connected to the front surface of the frame, wherein the pickup point comprises:
         a main body, the main body directly connected to the front surface of the frame and extending outward therefrom;
         a neck portion directly attached to and extending outwardly from the main body, wherein the neck portion is narrower in diameter than the main body and wherein the neck portion is the part of the pickup point that is intended to be gripped; and a head portion directly attached to and extending outwardly from the neck portion, wherein the head portion is greater in diameter than the neck portion; and a gantry, comprising:

a clamping gripper that clamps a pair of jaws into engagement with the pickup point of the basket, wherein the gantry engages with the basket at only the pickup point and this single-location engagement between the pair of jaws and the pickup point is configured to prevent uncontrolled rotational movements of the basket when the basket is moved.

2. The automated cooking system of claim 1, wherein the head portion is coextensive in diameter with the main body.

3. The automated cooking system of claim 1, wherein the main body and the head portion are tapered inwards towards the neck portion to help correct potential misalignment of the jaws of the clamping gripper on the pickup point.

4. The automated cooking system of claim 1, wherein the neck portion is coextensive in width to the jaws of clamping gripper.

5. The automated cooking system of claim 1, wherein the pickup point comprises:

a flat surface along a chord of a cross-section of the neck portion; and a dowel located above the flat surface of the neck portion, wherein the dowel spans a distance from the head portion to the main body, wherein at least the dowel is configured to engage with the jaws of the clamping gripper to prevent uncontrolled rotational movements of the basket when the basket is moved as to avoid impacts of the basket with any other basket of the automated cooking system.

6. The automated cooking system of claim 1, wherein the each of the jaws is C-shaped as to snugly fit the pickup point between the pair of jaws when engaging with the basket.

7. The automated cooking system of claim 1, wherein an edge of the jaw that contacts the pickup point of the basket is contoured to facilitate easier gripping of the pickup point.

8. An automated cooking system comprising:

a fryer basket, comprising:

a frame defining a storage space within the basket;

a pickup point operatively connected to the frame, wherein the pickup point comprises:

a main body, the main body operatively connected to the frame and extending outward therefrom;

a neck portion attached to and extending outwardly from the main body, wherein the neck portion is narrower in diameter than the main body and wherein the neck portion is the part of the pickup point that is intended to be gripped; and a head portion attached to and extending outwardly from the neck portion, wherein the head portion is greater in diameter than the neck portion; and a gantry, comprising:

a clamping gripper that clamps a pair of jaws into engagement with the pickup point of the basket, wherein the gantry engages with the basket at only the pickup point and this single-location engagement between the pair of jaws and the pickup point is configured to prevent uncontrolled rotational movements of the basket when the basket is moved, wherein the frame of the basket further includes panels configured to move between a closed position and an open position, the basket further comprises a product discharge mechanism positioned adjacent the frame and operatively coupled to the panels, the gantry further comprises an actuator arm configured to interact with the basket, suspended in place by the clamping gripper, in such a way as to cause the basket to discharge its contents, and wherein the actuator arm is pneumatically powered.

9. The automated cooking system of claim 8, wherein when not in active use the actuator arm is rotated away from the front of the gantry as to not cause inadvertent contact with the basket.

10. The automated cooking system of claim 1, further comprising:

a basket detection device, wherein the basket detection device is configured to detect a presence of the basket in front of the clamping gripper and wherein the basket detection device is used to line up the jaws of the clamping gripper with the pickup point of the basket.

11. The automated cooking system of claim 10, wherein the basket detection device is selected from a group consisting of a proximity switch, a torque sensor, and a laser.

12. A method of discharging food product from a fryer basket of an automated cooking system, the basket including a frame defining a storage space within the basket, a pickup point operatively connected to the frame, with the pickup point including a main body directly connected to the frame, a neck portion directly attached to and extending outwardly from the main body with a narrower diameter than the main body, and a head portion directly attached to and extending outwardly from the neck portion with a larger diameter than the neck portion, the basket further including two angled panels that are coupled to and extend from the frame, wherein each of the angled panels pivots between a closed position and an open position, and a product discharge mechanism positioned adjacent the frame and operatively coupled to the angled panels, the automated cooking system including a gantry attached to a gantry system, the gantry including a clamping gripper comprising a pair of jaws, and an actuator arm configured to interact with the basket, the method comprising:

aligning the jaws of the clamping gripper with the pickup point of the basket such that the pickup point is located between the jaws of the clamping gripper;

engaging the pickup point of the basket with the jaws of the clamping gripper such that the neck portion of the pickup point is secured between the jaws of the clamping gripper, wherein the pickup point and the jaws of the clamping gripper are collectively configured to prevent uncontrolled rotational movements of the basket when the basket is moved as to avoid impacts of the basket with any other basket of the automated cooking system, and wherein the larger diameters of the main body and head portion assure lateral positioning of the jaws of the clamping gripper in engagement with the neck portion;

transporting, via the gantry system, the basket to a location within the automated cooking system where the basket is to discharge its contained food product;

actuating the product discharge mechanism of the basket with the actuator arm of the gantry, thereby causing the angled panels of the basket to pivot to an open position, creating an opening in the bottom of the basket; and discharging food product contained within the basket through the opening in the bottom of the basket.

13. The method of claim 12, wherein the step of aligning the jaws with the pickup point includes using a basket detection device, wherein the basket detection device is configured to detect a presence of a basket in front of the clamping gripper.

* * * * *